(12) United States Patent
Kudo

(10) Patent No.: US 7,724,289 B2
(45) Date of Patent: May 25, 2010

(54) IMAGING APPARATUS

(75) Inventor: Toshimichi Kudo, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1047 days.

(21) Appl. No.: 11/130,463

(22) Filed: May 16, 2005

(65) Prior Publication Data
US 2005/0259164 A1 Nov. 24, 2005

(30) Foreign Application Priority Data
May 21, 2004 (JP) ............... 2004-151981

(51) Int. Cl.
H04N 5/76 (2006.01)
(52) U.S. Cl. .................. 348/231.2; 348/362
(58) Field of Classification Search ............. 348/231.2, 348/231.22, 222.1, 362, 231.3; 386/107, 386/117
See application file for complete search history.

(56) References Cited

U.S. PATENT DOCUMENTS

| 6,862,038 | B1 * | 3/2005 | Anderson | 348/207.99 |
|---|---|---|---|---|
| 7,084,908 | B2 * | 8/2006 | Suda | 348/231.2 |
| 7,193,646 | B1 * | 3/2007 | Shioji | 348/220.1 |
| 7,382,405 | B2 * | 6/2008 | Kusaka et al. | 348/231.6 |
| 2002/0060740 | A1 * | 5/2002 | Kato | 348/232 |
| 2002/0101518 | A1 * | 8/2002 | Suda | 348/231 |
| 2003/0174217 | A1 * | 9/2003 | Kito et al. | 348/231.2 |
| 2003/0182297 | A1 * | 9/2003 | Murakami et al. | 707/100 |
| 2004/0046877 | A1 * | 3/2004 | Shibutani | 348/231.1 |
| 2006/0120224 | A1 * | 6/2006 | Nakamura et al. | 369/30.3 |

FOREIGN PATENT DOCUMENTS

| JP | 2002-278996 A | 9/2002 |
|---|---|---|
| JP | 2004-120225 A | 4/2004 |
| WO | WO 03049424 A1 * | 6/2003 |
| WO | WO 2004029970 A1 * | 4/2004 |

* cited by examiner

Primary Examiner—Tuan Ho
(74) Attorney, Agent, or Firm—Canon U.S.A., Inc., IP Division

(57) ABSTRACT

A imaging apparatus includes an imaging unit, a photographing function setting unit that optionally sets operation conditions of the imaging unit, a recording unit that classifies image signals obtained by the imaging unit into groups and records the image signals on a recording medium, a group condition setting unit that optionally sets conditions for classifying the image signals into a plurality of groups, and a mode switching unit that switches between a recording manual setting mode for causing the imaging unit to execute photographing in accordance with the operation conditions set by the photographing function setting unit and the recording unit to classify and record the image signals in accordance with the conditions set by the group condition setting unit and a recording automatic setting mode for causing the imaging unit to execute photographing in accordance with predetermined operation conditions and the recording unit to classify and record the image signals in accordance with predetermined conditions.

13 Claims, 23 Drawing Sheets

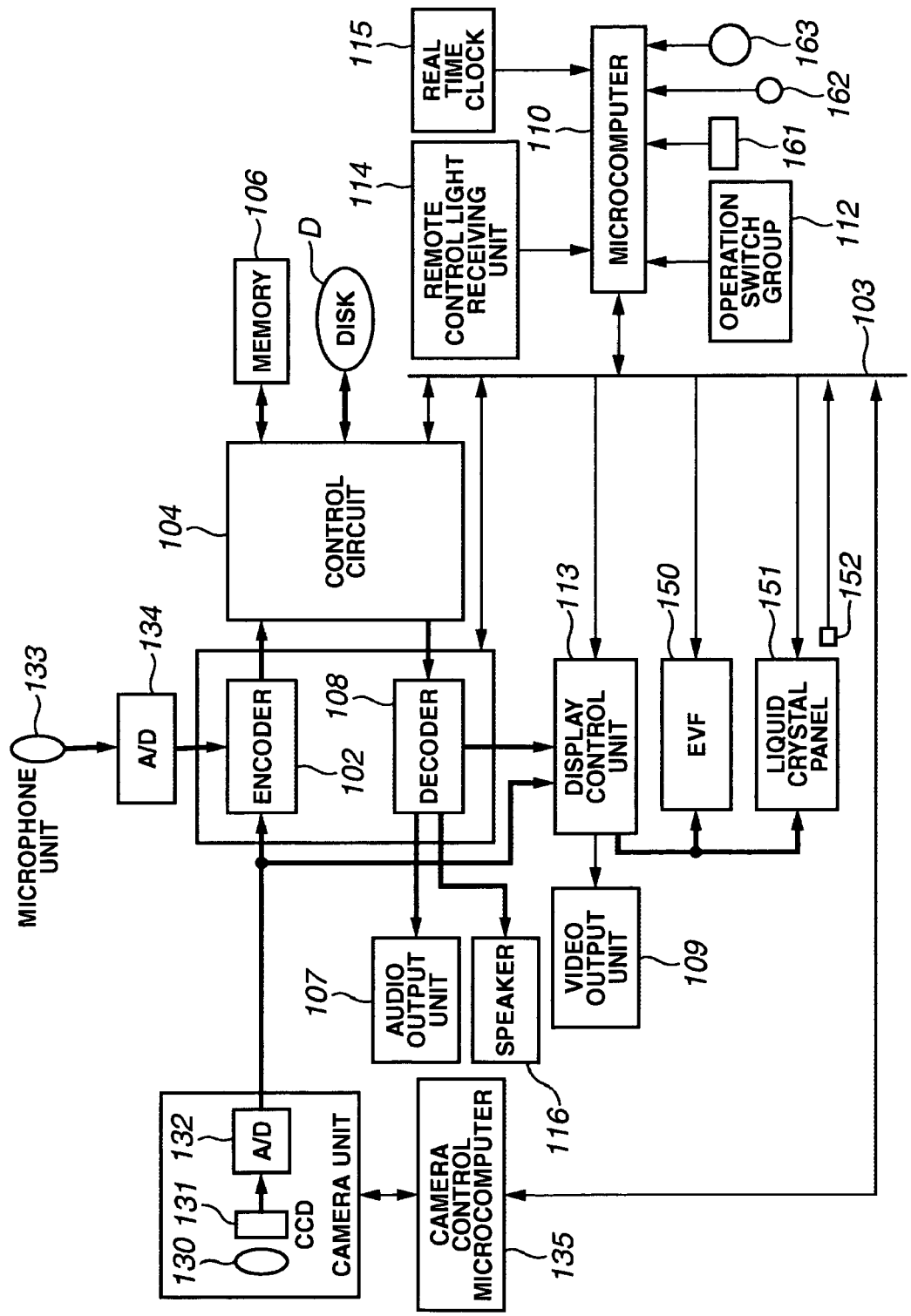

[MEDIA] :: = ("MOV" | "IMG" | "PLF")

```
                                                              501
<COLLECTION>  502                                      503
    <MOV src="MOV00100.MPG" id="MOV00100" type="movie"
                        dur="03:10.05" linkCount="2">
      <TBL src="MOV00100.TBL"/>  504
    </MOV>
</COLLECTION>
```

FIG.7

TIME MAP TABLE FILE

| FILE CREATION TIME |
| --- |
| TOTAL REPRODUCTION TIME(msec) |
| INTERVAL: Tcst(msec) |
| OTHER MANAGEMENT DATA |
| NUMBER OF GOP |
| GOP INFORMATION[GOP_ID] |
| NUMBER OF TIME SEARCH ENTRIES |
| TIME SEARCH INFORMATION [NUMBER OF TIME SEARCH ENTRIES] |

| GOP_ID |
| --- |
| ENTRY OFFSET: EFdif(frame) |
| GOP OFFSET: Gofs(byte) |
| ⋮ |

| ENTRY SIZE: Ens(pack) |
| --- |
| GOP REPRODUCTION TIME: Tgop(frame) |
| GOP SIZE: Gs(byte) |
| TIME CODE: TC (h:m:s:frame) |
| ⋮ |

ENTRY=n

| GOP_ID[n] |
| --- |
| ENTRY OFFSET: EFdif[n] |
| GOP OFFSET: Gofs[n] |
| ⋮ |

```
<COLLECTION>
<GROUP id="ORG0001">                                                    ~801
<MOV src='/VIDEO/MOV00100/MOV00100.4C#xpointer(id("MOV00100"))'/>        ~802
<IMG src='/DCIM/101XXXXX/101XXXXX.4C#xpointer(id("IMG_0001"))'/>         ~803
<MOV src='/VIDEO/MOV00200/MOV00200.4C#xpointer(id("MOV00200"))'/>        ~804
<IMG src='/DCIM/101XXXXX/101XXXXX.4C#xpointer(id("IMG_0002"))'/>         ~805
</GROUP>
</COLLECTION>
```

FIG.10

```
<COLLECTION>
<GROUP id="ORG0002">~1001
<MOV src='/VIDEO/MOV00100/MOV00100.4C#xpointer(id("MOV00100"))'/>~802
<IMG src='/DCIM/101XXXXX/101XXXXX.4C#xpointer(id("IMG_0001"))'/>~803
</GROUP>
</COLLECTION>
```

FIG.11

```
<COLLECTION>
<GROUP id="ORG0003">~1101
<MOV src='/VIDEO/MOV00200/MOV00200.4C#xpointer(id("MOV00200"))'/>~804
</GROUP>
</COLLECTION>
```

```
<COLLECTION>
<GROUP id="ORG0001">            ~801
   <GROUP src='/GRP/original/ORG00002.4C#xpointer(id("ORG0002"))'/>  ~1202
   <GROUP src='/GRP/original/ORG00003.4C#xpointer(id("ORG0003"))'/>  ~1203
   <IMG src='/DCIM/101XXXXX/101XXXXX.4C#xpointer(id("IMG_0002"))'/>  ~805
</GROUP>
</COLLECTION>
```

FIG.23

```
<COLLECTION>  ~502                                    ~503
    <MOV src="MOV00100.MPG" id="MOV00100" type="movie"
                            dur="03:10.05" linkCount="2">
        <TBL src="MOV00100.TBL"/>~504
        <RESUME time="01:5.22"/>~2304
    </MOV>
</COLLECTION>
```

FIG.24

```
<COLLECTION>
<GROUP id="ORG0001">~601
<RESUME time="01:5.22">~2406
<MOV src='/VIDEO/MOV00200/MOV00200.4C#xpointer(id("MOV00200"))'/>~2407
</RESUME>~2408

<MOV src='/VIDEO/MOV00100/MOV00100.4C#xpointer(id("MOV00100"))'/>~602
<IMG src='/DCIM/101XXXXX/101XXXXX.4C#xpointer(id("IMG_0001"))'/>~603
<MOV src='/VIDEO/MOV00200/MOV00200.4C#xpointer(id("MOV00200"))'/>~604
<IMG src='/DCIM/101XXXXX/101XXXXX.4C#xpointer(id("IMG_0002"))'/>~605
</GROUP>
</COLLECTION>
```

FIG.26

```
<smil>
<body>
<par>
<seq>
<video src='/VIDEO/MOV00100/MOV00100.4C#xpointer(//MOV[@id="MOV00100"])'/>  ~2601
<video src='/VIDEO/MOV00200/MOV00200.4C#xpointer(//MOV[@id="MOV00200"])'/>  ~2602
</seq>
<seq>
<audio src='/AUDIO/AUD00100/AUD00100.4C#xpointer(//AUD[@id="AUD00100"])'/>  ~2603
</seq>
</par>
</body>
</smil>
```

<video src='/VIDEO/MOV00100/MOV00100.4C#xpointer(//MOV[@id="MOV00100"])'/>

2702

<video src='/VIDEO/MOV00100/MOV00100.4C#xpointer(//MOV[@id="MOV00100"])
ClipBegin='00:00:50'ClipEnd='00:10:05

IMAGING APPARATUS

BACKGROUND OF THE INVENTION

1. Field of the Invention

The present invention relates to an imaging apparatus, and more particularly to an apparatus for classifying photographed image data into a plurality of groups and managing the image data.

2. Description of the Related Art

For video and digital cameras, there have conventionally been available many products which include a photographing mode for enabling a user to freely set various functions and an automatic mode for enabling easy handling. For example, in the automatic mode, basic photographing is carried out, e.g., making automatic exposure, focusing, white balancing and the like, and hand shaking correction is operative but special effects are inhibited (e.g., Japanese Patent Application Laid-Open No. 4-53368).

Recently, the capacity of data recording media such as a memory cards or optical cards has dramatically increased, and video camera products that use memory cards or optical disks as recording media have emerged. One of the features of video cameras that use memory cards or optical disks is a management function or an edit function of rearranging or combining recorded contents by utilizing random accessibility (e.g., Japanese Patent Application Laid-Open No. 2002-278996). According to the invention of this patent, contents can be freely grouped regardless of a general file system.

One of the edit functions is to create a so-called playlist and execute the contents of the list. This playlist is classified into a list which only arranges contents and a list which designates a reproducing start time and a reproducing end time for all contents and enables more meticulous reproduction control.

In the case of optical disks and memory cards, unlike video tape, a position where reproduction was stopped is not mechanically set. Thus, a function called a resume is generally mounted which stores a reproduction stopping position (address) and starts reproduction from this reproduction stopping position next time reproduction is started. As the resume function, a method of storing a stopping position for each title, and a method of storing a last stopping position with respect to the entire disk may be employed. The user may select one of the two methods from a menu.

However, the automatic mode described above is designed only to automate a camera function during photographing, but not to operate in conjunction with a recording method such as grouping.

Furthermore, an edit mode is not available which can easily create a playlist when a switch is turned on for setting the camera function to the automatic mode. The same holds true for a contents displaying method and a resume method of the reproduction mode.

Thus, even when the automatic mode is set, the user must set additionally a resume function for reproducing, grouping, conditions for playlist creation, and the like each time. Such process may be burdensome for a beginner.

SUMMARY OF THE INVENTION

One aspect of the present invention is to solve various problems described above.

Another aspect of the present invention is to provide an apparatus which automates not only a photographing function but also processing such as grouping of photographed image data which enables easy use even for a beginner.

According to one aspect of the present invention, an imaging apparatus includes an imaging unit that images and converts objects into image signals, a photographing function setting unit that optionally sets operation conditions of the imaging unit, a recording unit that classifies the image signals obtained by the imaging unit into groups and records the image signals on a recording medium, a group condition setting unit that optionally sets conditions for classifying the image signals recorded by the recording unit into the plurality of groups, and a mode switching unit that switches between a recording manual setting mode for causing the imaging unit to execute photographing in accordance with the operation conditions set by the photographing function setting unit and the recording unit to classify and record the image signals in accordance with the condition set by the group condition setting unit and a recording automatic setting mode for causing the imaging unit to execute photographing in accordance with predetermined operation conditions and the recording unit to classify and record the image signals in accordance with predetermined conditions.

Other features and advantages of the present invention will become apparent to those skilled in the art upon reading of the following detailed description of embodiments thereof when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 shows a configuration of a video camera according to an embodiment of the present invention.

FIG. 7 shows an entry frame and a time search entry frame of moving image data.

FIG. 10 shows a descriptive example of a management file.

FIG. 11 shows a descriptive example of a management file.

FIG. 23 shows a descriptive example of a management file.

FIG. 24 shows a descriptive example of a management file.

FIG. 26 shows a descriptive example of a playlist file.
FIG. 27 shows a descriptive example of a playlist file.

DETAILED DESCRIPTION OF THE EMBODIMENTS

Figure 2A:
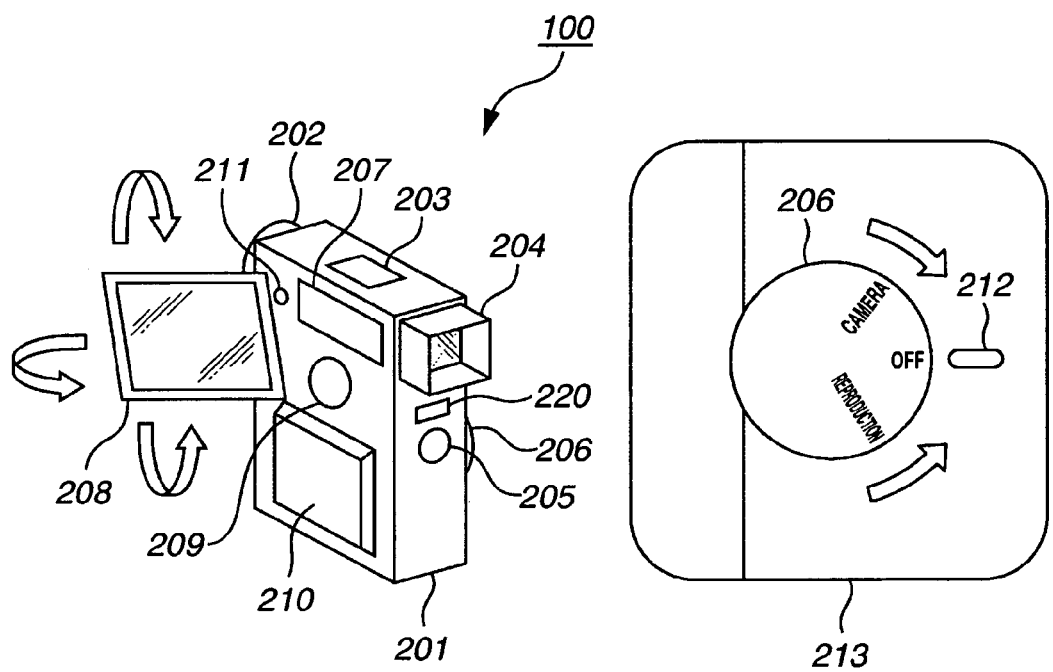
FIGS. 2A to 2C show appearances of the video camera.
Figure 2B:
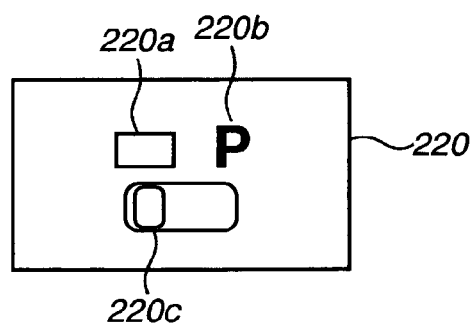
Figure 2C:
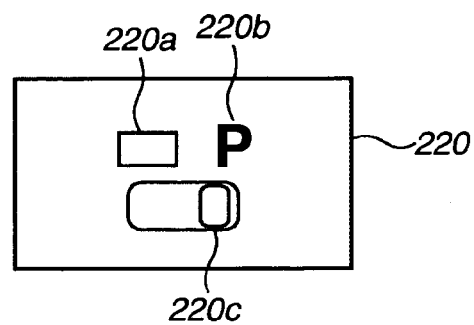

FIGS. 2A to 2C show appearances of a video camera 100 according to an embodiment of the present invention. A basic system will be described with reference to FIGS. 2A to 2C.

Referring to FIG. 2A, a reference numeral 201 denotes a video camera main body. A recording medium such as a hard disk or an optical disk is placed in the video camera main body 201, and encoded image data is recorded/reproduced on/from the recording medium by a moving picture experts group (MPEG) 2 system or the like. A reference numeral 202 denotes a lens, and a reference numeral 203 denotes a microphone provided to record voices during photographing. A reference numeral 204 denotes an electronic view finder (EVF) provided to capture or confirm an object during camera photographing. The EVF 204 can be turned OFF by a control (not shown) in the main body. A reference numeral 205 denotes a trigger switch. The trigger switch 205 is a push button operated by a user to transmit the direction to start or finish photographing. A reference numeral 206 denotes a mode dial, i.e., a rotary switch.

A reference numeral in FIG. 2A shows a front of the mode dial 206. In the mode dial 206, for example, "REPRODUCE" for setting a reproducing mode, "CAMERA" for setting a camera mode, and "OFF" for turning main power OFF are marked. A reference numeral 212 denotes a bar marked in the main body. The mode dial 206 is rotated by user operation, and started in a mode matched with a position of the bar 212. In the reproducing mode, there are functions of turning OFF the camera, reproducing recorded images, and editing and deleting the images. The main purpose of camera mode, on the other hand, is photographing.

A reference numeral 207 denotes an operation switch group in which keys especially for reproducing system and menu operations and the like are arranged to enable the user to operate the main body. A reference numeral 208 denotes a liquid crystal display (LCD) panel mounted to a main body side face so as to be freely opened/closed. Similar to the EVF 204, an object image for photographing is confirmed and a reproduced image is displayed on the LCD panel 208. The LCD panel 208 can be turned OFF by a control in the main body (not shown), similar to the EVF 204. The LCD panel 208 can be rotated in a horizontal direction from the main body while in its opened position.

A reference numeral 211 denotes a panel opening/closing detection switch for electrically detecting a closed position of the LCD panel 208. According to the embodiment, there is a projection in a frame of the LCD panel 208 and the panel opening/closing detection switch 211 is pressed in the closed position. A control system can recognize two states, i.e., press and release states, of the panel opening/closing detection switch 211. A reference numeral 209 denotes a speaker for outputting a voice during reproducing, a reference numeral 210 denotes a battery detachably attached to the main body, and a reference numeral 220 denotes a photographic mode changing switch which selects an automatic mode or a program AE mode.

FIGS. 2B and 2C show the photographic mode changing switch 220. A reference numeral 220a denotes an automatic mode mark, a reference numeral 220b denotes a program AE mode mark, and both are marked in the main body by printing or the like. A reference numeral 220c denotes a slide switch which slides left and right to transmit the two states to a microcomputer 110 (described later). FIG. 2B shows a state in which the automatic mode is set, and FIG. 2C shows a state in which the program AE mode is set.

In the automatic mode photographing conditions such as focus, exposure, and white balance are automatically set in accordance with predetermined conditions. On the other hand, the program AE mode enables the user to set the conditions in accordance with the user's preference. Generally a consumer video camera allows a user, in the AE program mode, to select a pattern matched with a typical photographing condition for exposure.

As the program AE mode, the embodiment provides a sports mode for photographing a fast-moving object, a portrait mode for photographing a human or the like by blurring the background, a spotlight mode for photographing an object illuminated by a spotlight, and automatic mode which is in principle automatically set, and the like. Many types of recent video cameras include hand shaking correction functions because of high zoom magnification. In such video cameras, in the automatic mode, the hand shaking correction function is forcibly made effective. In the program AE mode, conditions are set by the user.

In short, the automatic mode enables the user to photograph by its simple operation of zooming and instructing a start/end of photographing, and the program AE mode enables the user to set various photographing functions.

FIG. 1 shows an internal configuration of the video camera 100 of FIG. 2A.

Referring to FIG. 1, a reference numeral 130 denotes a lens unit which includes a fixed lens group for converging lights, a variable power lens group, a diaphragm, and a correction lens group having functions of correcting an image forming position shifted by a movement of the variable power lens group and adjusting a focus. By the lens unit 130, an object image is lastly formed on an image forming surface of a CCD 131 (described below). The reference numeral 131 denotes a charge coupled device (CCD) for converting a light into charges to generate an image signal, and a reference numeral 132 denotes an A/D processing unit for executing predetermined processing for an imaging signal to output digital image data. The lens unit 130, the CCD 131, and the A/D processing unit 132 constitute a camera unit. The camera unit includes a variable power lens group (not shown), an actuator such as a diaphragm, a sensor for correcting hand shaking (e.g., angular speed sensor), and a correction unit (such as shift lens) for the same.

A reference numeral 135 denotes a camera control microcomputer for controlling the camera unit in accordance with controlling by the microcomputer 110 (described later), which serves to transmit information of the camera unit, e.g., information such as focusing information or hand shaking information obtained from the camera unit, to the microcomputer 110.

A reference unit 133 denotes a microphone unit provided to collect voices during photographing, which carries out predetermined amplification, a band limit and the like. A reference numeral 134 denotes an A/D processing unit which receives an output of the microphone unit 133 and outputs digital voice data.

The reference numeral 110 denotes the microcomputer which controls each unit in FIG. 1. The microcomputer 110 includes a nonvolatile memory (ROM) for storing a program, a volatile memory (RAM) which is a work area, an external bus for passing data with other hardware and accessing a control register, and a timer for measuring time. A reference numeral 103 denotes a bus. Each block is connected to the bus 103 which is a transmission path for transferring data in accordance with control of the microcomputer 110.

A reference numeral 102 denotes an encoder which receives digital image data and digital voice data in accordance with the control of the microcomputer 110, and encodes the data in the MPEG 2 format to compress the information amount thereof, and time-sequentially multiplexes the data to generate compressed video data. Further, the encoder 102 has a function of compressing in a JPEG format and outputting compressed static image data. The encoder 102 has a function of notifying necessary information, e.g., conversion of data and frame positions, to the microcomputer 110.

A reference numeral 104 denotes a control circuit. The control circuit 104 includes an interface between the encoder 102 and a memory 106 (described later), an optical disk D and a decoder 108, and controls data transfer based on controlling by the microcomputer 110.

The control circuit 104 includes an optical head for writing/reading data on/from the optical disk D, a seeking mechanism for moving the optical head, a mechanical deck including a seek motor, a spindle motor and the like for rotary-driving the optical disk D, a control circuit for controlling such components, and an interface (e.g., ATAPI I/F) connected to the control circuit 104. The control circuit 104 further includes a so-called direct memory access (DMA) for automatically transferring read or written data by designating a head address and a data amount of the memory 106 and a head sector written in the optical disk D.

The reference numeral 106 denotes a memory which each block can use for work.

A reference numeral 108 is a decoder which sequentially reads compressed video data or compressed static image data from a designated address of the memory 106 to the microcomputer 110, converts the data into a digital picture signal or a digital voice signal of, e.g., ITU-R BT. 656 (CCIR 656), and outputs the signal.

A reference numeral 107 denotes a voice output unit, and a reference numeral 109 denotes a video output unit. The video output unit 109 and the voice output unit 107 are blocks for converting the digital picture and voice signals converted by the decoder 108 into analog signals and outputting the signals to the outside, which are connected to a television receiver or the like. A reference numeral 116 denotes a speaker unit for receiving the digital voice signal to reproduce a voice.

A reference numeral 113 denotes a display control unit which multiplexes pieces of information on various setting menus, titles and time as information for on-screen displaying (OSD) on a picture signal output from the decoder 108 or the camera unit, and generates picture signals of various display screens in accordance with an instruction from the microcomputer 110. The display control unit 113 has a function of capturing the digital picture signal input from the decoder 108, reduces the signal, and superimposes the signal on an optional position.

A reference numeral 112 denotes an operation switch group, a reference numeral 161 denotes a photographing mode changing switch, a reference numeral 162 denotes a trigger switch, and a reference numeral 163 denotes a mode dial. The microcomputer 110 determines a signal input by a user's operation, and executes the functions described above with reference to FIGS. 2A to 2C.

A reference numeral 114 denotes a remote control light receiving unit which receives a signal from an infrared remote controller (not shown), and transmits the signal as a pulse to the microcomputer 110. The microcomputer 110 converts the signal into data, and recognizes the data as a control command. The infrared remote controller is a user's input means similar to the operation switch group 112. A reference numeral 115 denotes a real time clock which transmits calendar and time information to the microcomputer 110. An initial value and a count start command are input through the operation switch group by the user, and supplied via the microcomputer 110. They are used for time stamp information or the like which is supplied to recorded picture contents.

The microcomputer 110 contains software for handling a predetermined file system, and controls data reading/writing on/from the optical disk D in accordance with this file system. One round from a recording start to its end is basically managed as one content, and recorded as a moving image file (described later). However, a plurality of contents may constitute one file.

Next, processing for recording will be described.

When power is turned ON, the microcomputer 110 retrieves a recording enable (empty) area in the disk D in accordance with the file system. At this time, a recording enable capacity is calculated, and a recording enable time is calculated from the recording enable capacity and a recording mode. During recording, a reduction in the recording enable capacity is monitored to periodically update the recording enable time. The microcomputer 110 always detects a state of the operation switch group 112 and monitors the user's operation. Hereinafter, it is assumed that the user's operation is transmitted through the operation switch group 112 to the microcomputer 110 unless otherwise specified.

Next, when the user generates a recording start request, the microcomputer 110 controls each block to start recording of a camera image and a voice. First, the encoder 102 starts a MPEG 2 encoding processing, and compressed video data is output to the control circuit 104. The control circuit 104 designates an address of the memory 106 to temporarily store the compressed video data in the memory 106. Then, each time a predetermined amount of data is stored, the control circuit 104 notifies the microcomputer 110 of the storage by means such as interruption.

The microcomputer 110 that has received the notice next notifies a head address of the memory 106 for storing the compressed video data to the control circuit 104. Further, the microcomputer 110 issues a command to the control circuit 104 to write the compressed video data stored in the memory 106 in the optical disk D. At this time, the recording area of the optical disk D is a recording enable (empty) area retrieved in accordance with the file system. A series of operations from this encoding process to the writing in the optical disk D are repeated until a recording stop request is generated.

The compressed video data which was recorded is entered as a moving image data file (extension "mpg") described below. Management information of contents is written in a management file (extension "4C") described below. Information necessary for special reproduction, a playlist or editing, is written by generating a time map table file (extension "tb1")

Next, a reproducing operation will be described.

The user selects the contents to be reproduced via the operation switch group 112. According to the embodiment, a contents list or a representative image (thumbnail) corresponding to the contents list is displayed (hereinafter referred to as the contents selection screen), a pointer is moved to desired contents, contents are selected, and reproduction starts. In addition, by directly pressing a reproduce key (or key allocated to issue a reproducing command), for example, head contents, a sequel to the last reproduction, or lastly recorded contents may be reproduced.

The microcomputer 110 issues a command to the control circuit 104 to read the compressed video data of the contents selected from the optical disk D and store the data in the memory 106. At this time, a reading head sector of the optical disk D, a writing head address of the memory 106, and a data amount are designated by the microcomputer 110.

Next, the microcomputer 110 issues a command to the decoder 108 to decode the compressed video data stored in the memory 106. A series of operations are repeated to prevent cutting-off of compressed video data decoded by the decoder 108 until an instruction comes in to finish, stop, or temporarily stop the contents.

Figure 3:
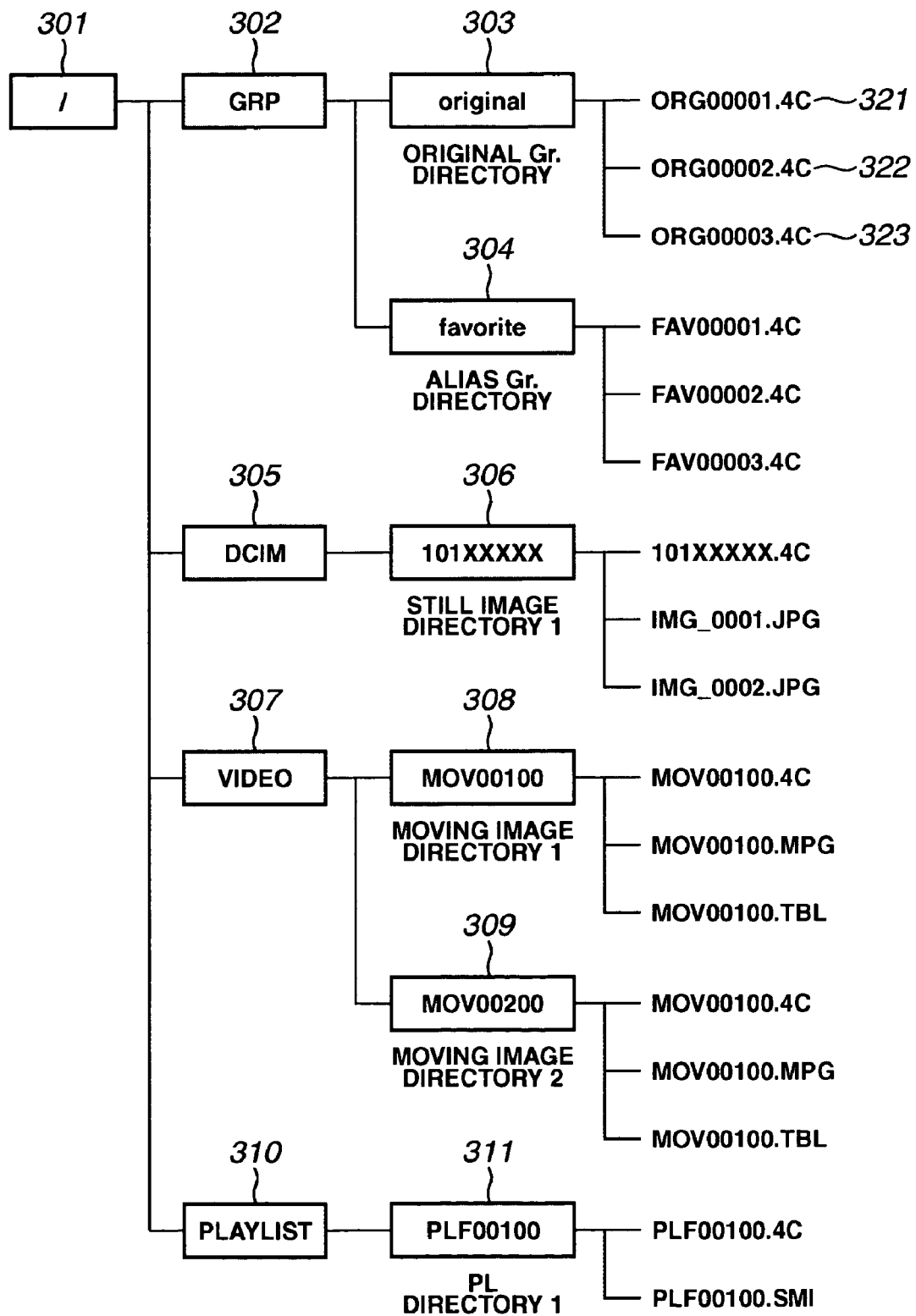
FIG. 3 shows a file structure and a directory recorded on an optical disk.

FIG. 3 shows an example of a state in which moving image data, voice data, static image data, and a playlist are stored in the recording medium. A reference numeral 301 denotes a highest layer directory for storing a file group generated by the system. Here, it is named a root directory. A file whose extension is ".4C" is a management file (described later), and a file whose extension is ".TBL" is a time map table file (described later).

A reference numeral 305 denotes a DCIM directory for storing static image data as established in a DCF standard. The moving image data is a file whose extension is ".MPG". The playlist is a file whose extension is ".SMI". In reality, as shown in FIG. 3, subdirectories are created below these directories, and files are stored therein.

Storage directories of data are created one after another by increasing numerals of subdirectory names, i.e., 4-digit numerals according to the embodiment. FIG. 3 shows two moving image directories 308 and 309 of the moving image directory only, but the same holds true for a static image directory 306 and a PL directory 311.

In the PL directory, the moving image directory, and the static image directory, management files (the files whose extensions are ".4C") are stored to manage the files stored in the above directories. The management files will be described in detail later.

A reference numeral 302 denotes a GRP directory, a reference numeral 303 denotes an original group (Gr.) directory, and a reference numeral 304 denotes an alias group (Gr.) directory. The GRP directory 302 has the original Gr. directory 303 and the alias Gr. directory 304 as subdirectories. The original Gr. directory 303 is for arranging original group files 321 to 323. These directories will be described later with reference to a grouping function.

The DCIM directory 305 and below correspond to another standard called a DCF standard, and must always be arranged below the root directory. It is accordingly permitted to collect other directories below another directory.

Figures 4, 5:
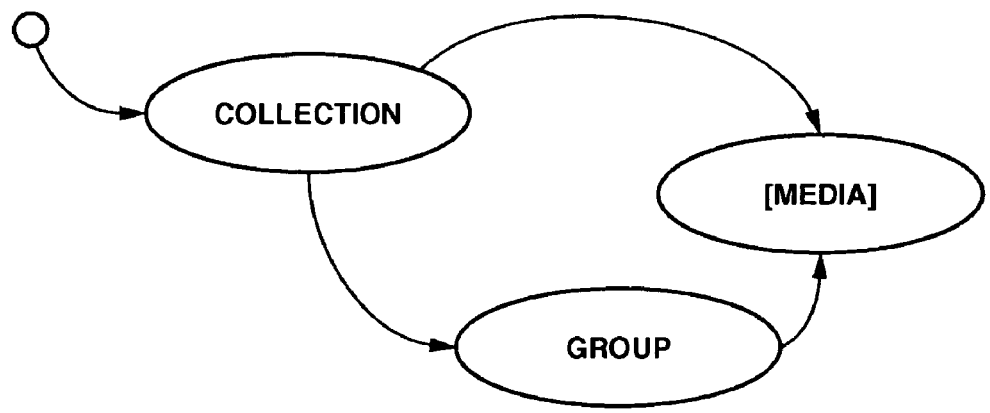
FIG. 4 shows a state of a management file.
FIG. 5 shows a descriptive example of a management file.

The management file is a text file described in an extensible markup language form (XML). FIG. 4 shows an element structure of an XML document which constitutes the management file.

A COLLECTION element is a root element of the management information.

A GROUP element is used for grouping media objects such as moving and static images. The GROUP element has an id attribute. An IMG element is used for describing an entry of static imagedata. The IMG element has src, id, type, linkCount, and deleted attributes. The src attribute is used for describing a file name, and the id attribute is used for describing a file identification name. The identification name designated by the id attribute is unique in the management file. The type attribute represents a file type, and takes on an "image" value in the case of a static image. An attribute value of the linkCount attribute is an integer indicating a number of times of referring to each entry from the playlist. The deleted attribute is deletion information, and an attribute value is "true" or "false". If the file is deleted when the linkCount attribute value is not 0, the deleted attribute value is set to "true".

An MOV element is used for describing an entry of moving image data. As in the case of the IMG element, the MOV element has src, id, type, linkCount, and deleted attributes, and further has a dur attribute. A type attribute value is "movie" in the case of a moving image. The dur attribute describes a reproducing time of the entire moving image data, and takes on a clock value. The clock value (Clock-value) is represented by the following equation:

Clock-value::=(Full-Clock-value|Partial-Clock-value|Timecount-value)

Full-Clock-value::=Hours ":" Minutes ":" Seconds ("." Fraction)?

Partial-Clock-value::=Minutes ":" Seconds ("." Fraction)?

Timecount-value::=Timecount ("." Fraction)? (Metric)?

Hours::=DIGIT+; any positive number

Minutes::=2 DIGIT; range from 00 to 59

Seconds::=2 DIGIT; range from 00 to 59

Fraction::=DIGIT+

Timecount::=DIGIT+

2 DIGIT::=DIGIT DIGIT

DIGIT::=<0-9>

For example, 14 min. 2 sec. is described as "00:14:03" or "14:03".

A PLF element is used for describing an entry of a playlist file (PLF) described below. As in the case of the MOV element, the PLF elements have src, id, type, linkCount, deleted, and dur attributes. There is a possibility that the PLF itself will be referred to by the other playlist. Thus, the linkCount and deleted attributes are prepared for the PLF element. A type attribute value is "playlist" in the case of the PLF.

An extension for the file name of the management file is presumed to be ".4C".

Next, FIG. 5 shows a descriptive example of management information of a moving image directory "MOV 00100" shown in FIG. 3.

There is one MOV element 503 in a COLLECTION element 502, and each attribute is as described above. The MOV element has a TBL element 504. An src attribute of the TBL element 504 is "MOVE 00100. TBL" indicating a time map table to be referred to. Other related files may be described here. For example, in the case of creating another file by post-recording, an element indicating a voice file may be described in this position.

Each element can have a title attribute. A name such as a group or each content is described by the title attribute.

Figure 6:
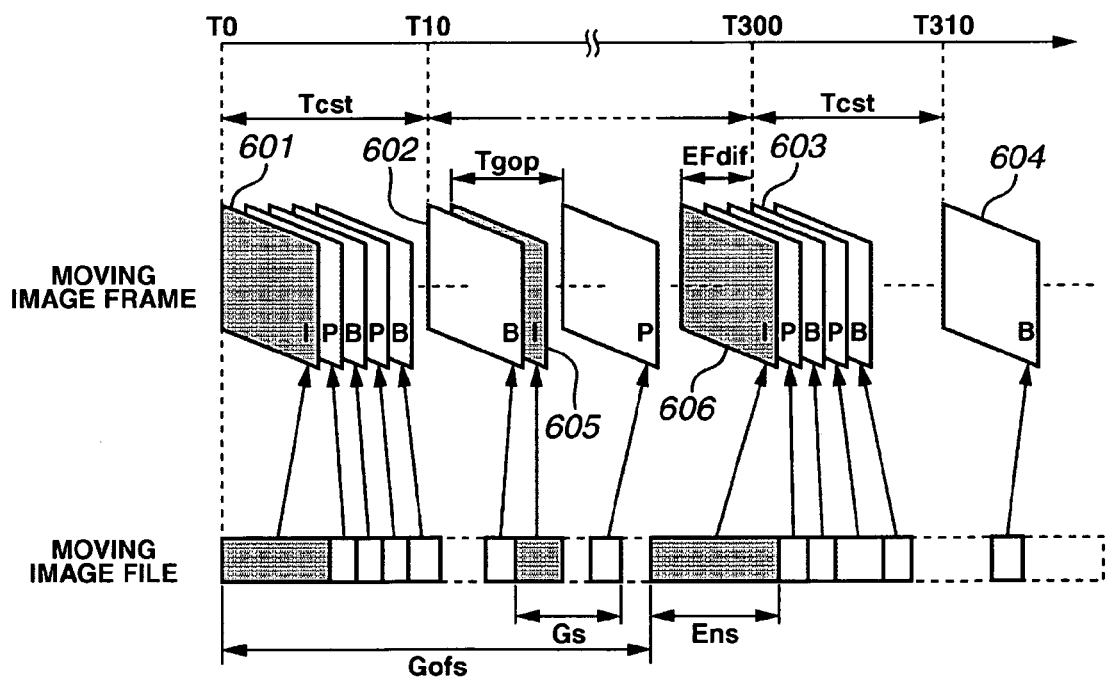
FIG. 6 shows a structure of a time map table.

FIG. 6 shows a moving image frame and a moving image data file in an imagined form to explain the time map table, and FIG. 7 shows a data structure of the time map table.

The MPEG 2 system is a prediction encoding system of a motion compensation type for compressing an information amount and encoding data by using a correlation between screens. An I picture is an image encoded in a frame, and a P picture is an image encoded by inter-frame prediction encoding with a past frame. Further, a B picture is image data of each frame between I and P pictures or between P pictures, and is an image encoded by two-way prediction encoding using image data of past and future frames. In FIG. 6, the images are denoted by I, B and P. According to the MPEG 2, a group of pictures (GOP) is constituted of a predetermined number of frames. Each GOP includes at least one frame of an I picture. Thus, random accessibility is improved to facilitate editing at a predetermined level.

In FIG. 6, T0, T10, T300, and T310 denote times. Tcst is an interval time for creating a time search entry (described later). Reference numerals 601 to 604 denote time search entry frames, and each is a frame for each Tcst. Tgop is a GOP reproducing time, and Gs indicates a GOP size. TC is a time code of a head frame of GOP. The time code here is equivalent to a frame number from a head of each content which is established during recording. Accordingly, in the case of executing partial deletion by a GOP unit, discontinuity occurs before/after the deletion. A unique GOP_ID is added to each GOP. Tgop and Gs are recorded for each GOP_ID.

Each time search entry has the following pieces of information: GOP_ID containing a time search entry frame corresponding to the time search entry, offset (EFdif) from an entry frame to the time search entry frame, and offset (Gofs) from a head to the entry frame. The entry frame is a head of frame data necessary for decoding each time search entry and making image data. As descried above, according to the MPEG 2, the B and P pictures are included, and these pictures are encoded by using a correlation between the frames of the I or the I and P pictures. Accordingly, when time search entries are B and P pictures, the entry frame is a head frame necessary for decoding the image. When a time search entry frame is an I frame, the frame itself becomes an entry frame, and Efdif=0 is established. FIG. 6 shows a case of the time search entry frame 601.

Each of these pieces of information takes a structure similar to that shown in FIG. 7, which is included in a time map table file (extension is ".TBL").

A method of restoring the time search entry frame 603 of the time T300 based on the time map table will be described as an example. The time search entry is created for each Tcst. Thus it becomes an n-th entry if the following is established:

$$n = T300/Tcst$$

Accordingly, GOP_ID [n] that is time search information [n] is obtained. From a member Gofs [n] of the GOP_ID [n], the number of bytes from the head to the entry frame 606 is known. It is also possible to know from the EFdig [n] which number-th frame from the entry frame 603 is a time search entry frame 603. Thus, by starting decoding from the Gofs [n] byte from the head and displaying the EFdif [n], frames from the time T300 can be reproduced. As a result, frame retrieval is facilitated.

On the other hand, in the case of designating a frame by a time code, TC is retrieved to specify GOP_ID [m] close to desired one, and Gs [1 . . . m] up to the GOP_ID [m] is simultaneously added, and offset of the GOP_ID is calculated. By reproducing a frame obtained by advancing (designated frame-TC) frames, it is possible to designate an unchanged frame.

By the aforementioned method, it is possible to specify frames based on the relative time from the head of the contents as well as on the absolute time (time code).

It is to be noted that the time map table described here is reconstructed, for example, when partial deletion is carried out. But no partial deletion is carried out less than a GOP unit. The TC is not changed.

The description has been made with the example of the moving image. In reality, however, pieces of information such as audio data and pack header are also incorporated, and these are added to create a table.

Figures 8, 9:
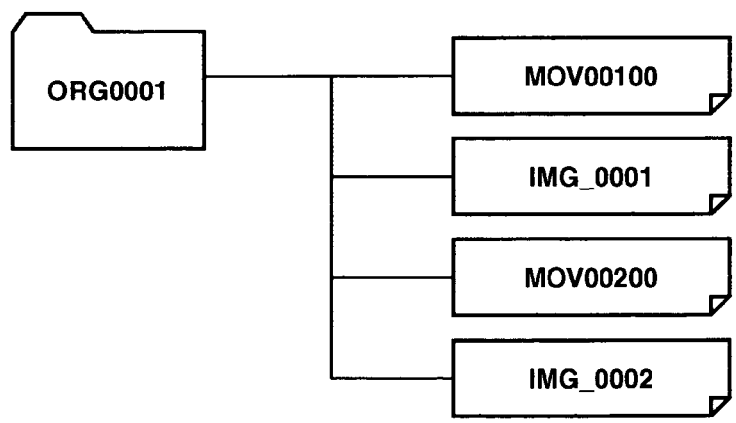
FIG. 8 shows a descriptive example of a management file.
FIG. 9 shows a display example of an original group.

Next, the grouping function will be described. There is always one original group file for each disk, and all the contents must be registered only in one of the original group files. FIG. 8 shows as an example a description of the original group file shown in FIG. 3.

A reference numeral 801 denotes a GROUP element, and an id attribute is ORG 0001. Reference numerals 802 to 805 denote elements for referring to contents registered in the GROUP element 801. A value of an src attribute up to # is a path of a management file (.4C) present in each directory, describing ID added to contents to refer to a value of link destination ID of xpointer (id ("link destination ID")) thereafter. Accordingly, to group the contents, a management file of each directory is indirectly referred to.

Here, ORG 0001 is a root group which is a highest layer of the original group. FIG. 9 shows this group in a conceptual form.

Next, a method of realizing a hierarchical structure will be described with reference to FIGS. 10 to 12.

FIG. 10 shows an original group file similar to that of FIG. 8. A reference numeral 1001 denotes a GROUP element, and an id attribute is ORG 0002. An MOV element 802 and an IMG element 803 are registered.

FIG. 11 shows an original group file similar to that of FIG. 8. A reference numeral 1101 denotes a GROUP element, and an id attribute is ORG 0003. An MOV element 804 is registered.

Figures 12, 13:
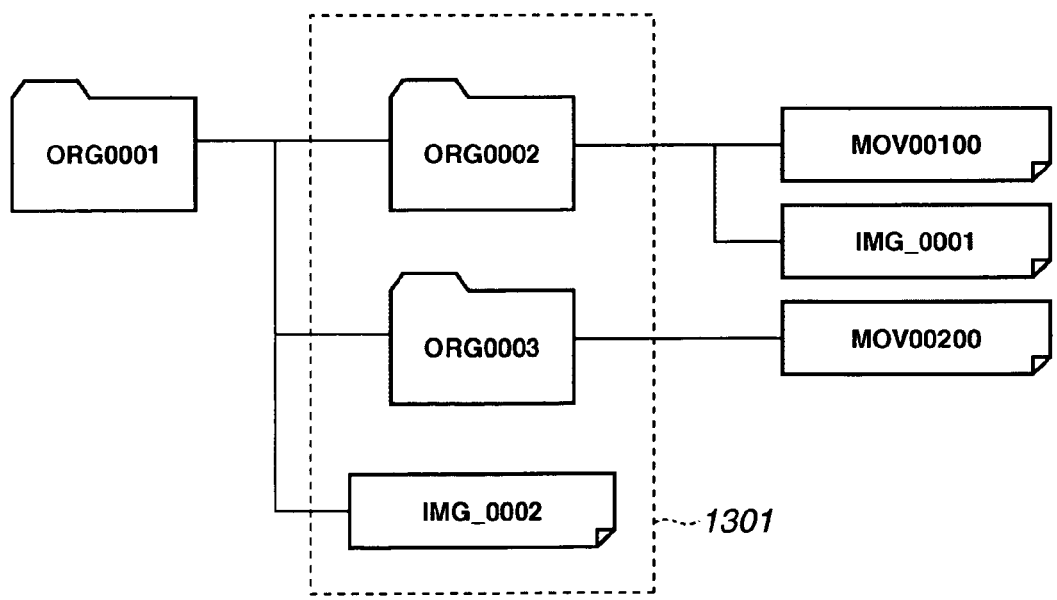
FIG. 12 shows a descriptive example of a management file.
FIG. 13 shows a display example of an original group.

FIG. 12 shows an example of editing the file of FIG. 8. Unlike FIG. 8, there are GROUP elements 1202 and 1203 in the registered element group. This means that the groups of FIGS. 10 and 11 are registered and a hierarchical structure is realized. FIG. 13 shows this structure 1301 in a conceptual form.

According to the embodiment, the grouping function is realized by the aforementioned method, and provides a GUI of a higher degree of freedom to the user by concealing the file name and the directory structure created by the file system and showing only the original group.

The grouping function described thus far is a function realized by utilizing the random accessibility of the recording medium. The function is difficult to be realized on a conventional video tape. However, some beginners are generally used to the conventional video tapes, and may be confused with such a function. The aforementioned automatic mode is mainly for allowing photographing with a minimum operation for the beginner or for unexpected sudden use. Next, a grouping process by the automatic mode will be described with reference to a flowchart of FIG. 14.

Figure 14:
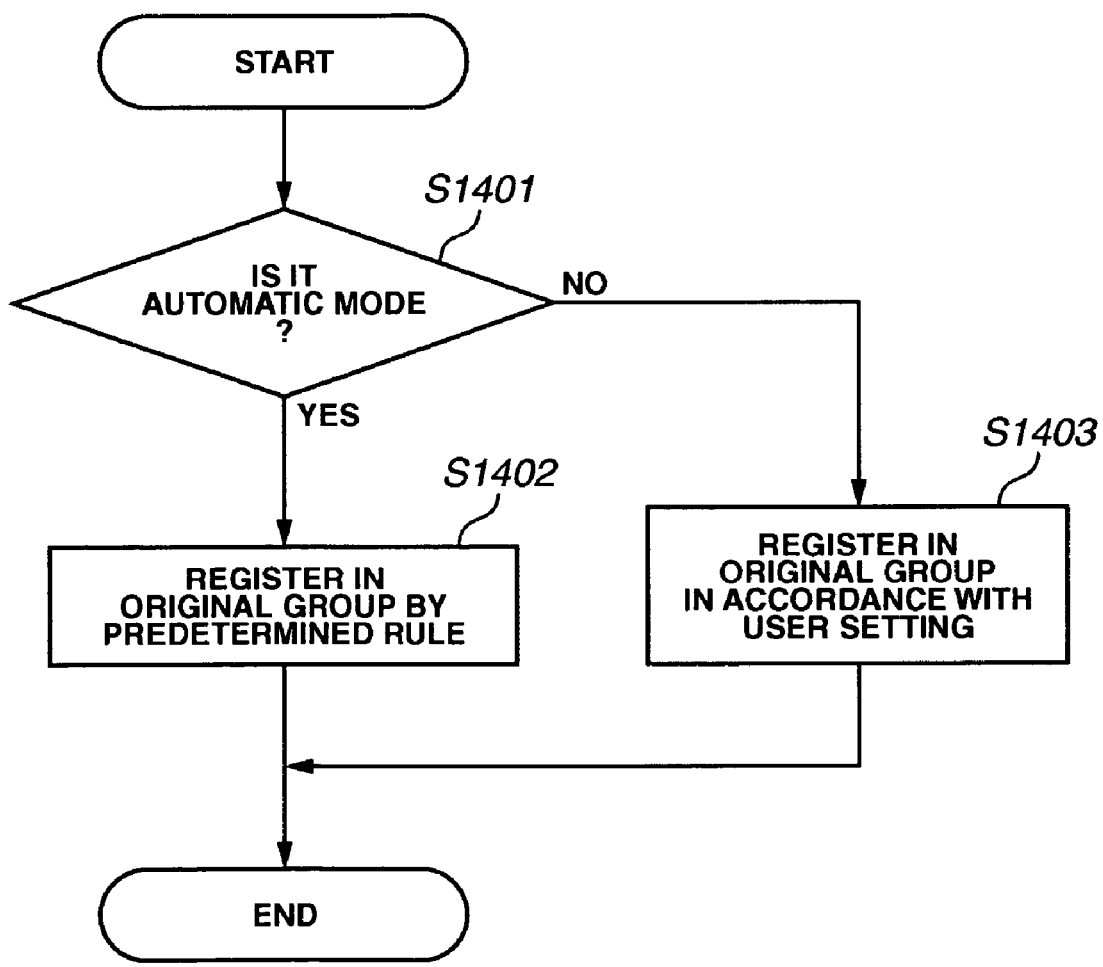
FIG. 14 is a flowchart showing a recording operation according to the embodiment.

The process of FIG. 14 is executed at the time of photographing.

First, a step S1401 determines whether the automatic mode has been set based on a position of the photographing mode changing switch 220 of FIGS. 2A to 2C. The process proceeds to a step S1402 if the automatic mode has been set, and to a step S1403 if the automatic mode has not been set.

If the automatic mode has been set, in the step S1402, photographed contents are registered in a group in accordance with a predetermined rule.

Specifically, for example, the contents are registered in a root group (id="ORG 0001") in photographing order as shown in FIG. 12.

Figure 15:
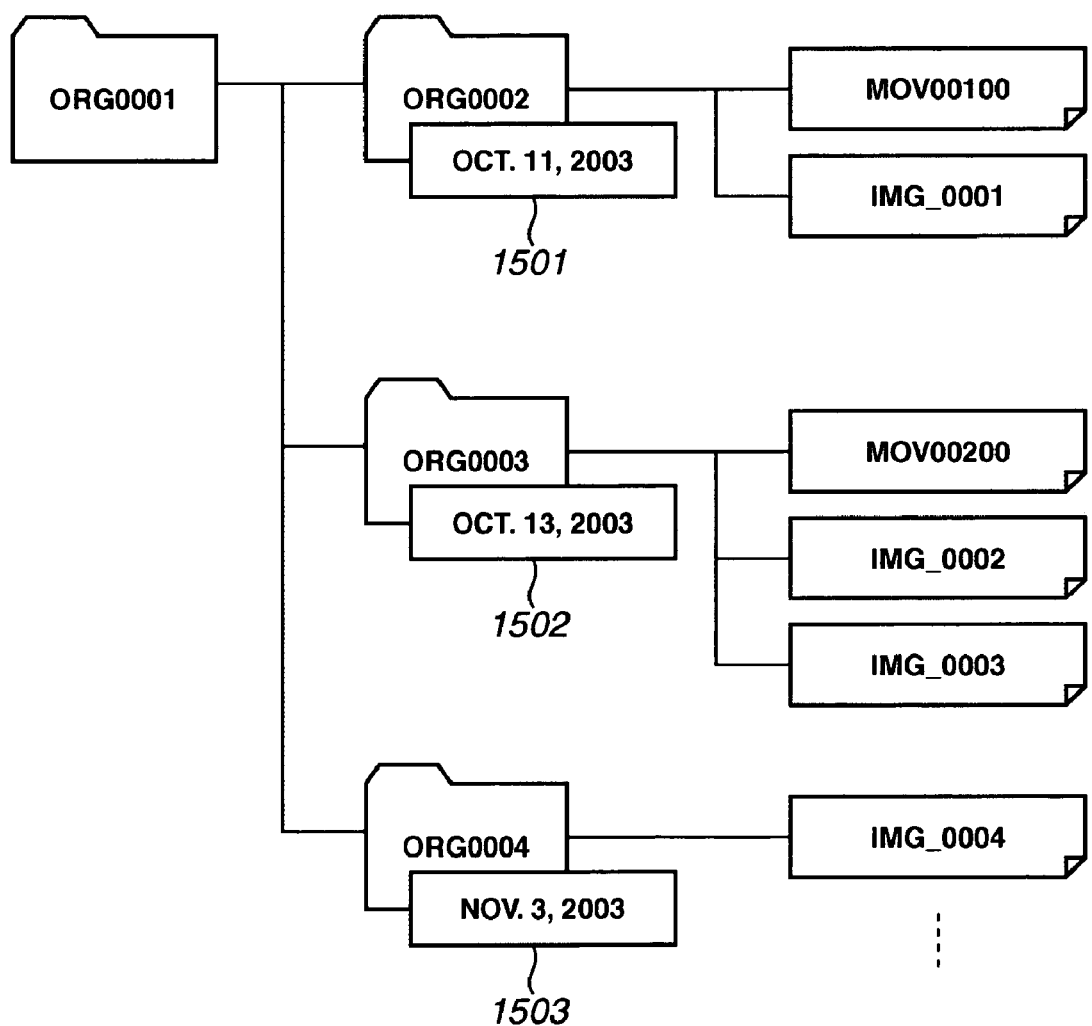
FIG. 15 shows a display example of an original group.

FIG. 15 shows another example. Reference numerals 1501, 1502 and 1503 denote original group titles. A group is automatically generated for each date in the automatic mode, and such a title is given. In each original group, contents photographed at the date of the title are registered. In other words, a new group is automatically generated when a date changes from a last photographing day, and photographed contents are registered in the group.

Here, the two specific examples have been shown, and the process of registering the contents photographed in accordance with the predetermined rule in the original group as described above is the step s1402.

Returning to FIG. 14, if the automatic mode has not been set, then in the step S1403, the photographed contents are registered in the group in accordance with conditions set by the user. Here, the group conditions for registration are set by the user on the menu or the like of the main body before photographing.

Figure 16:
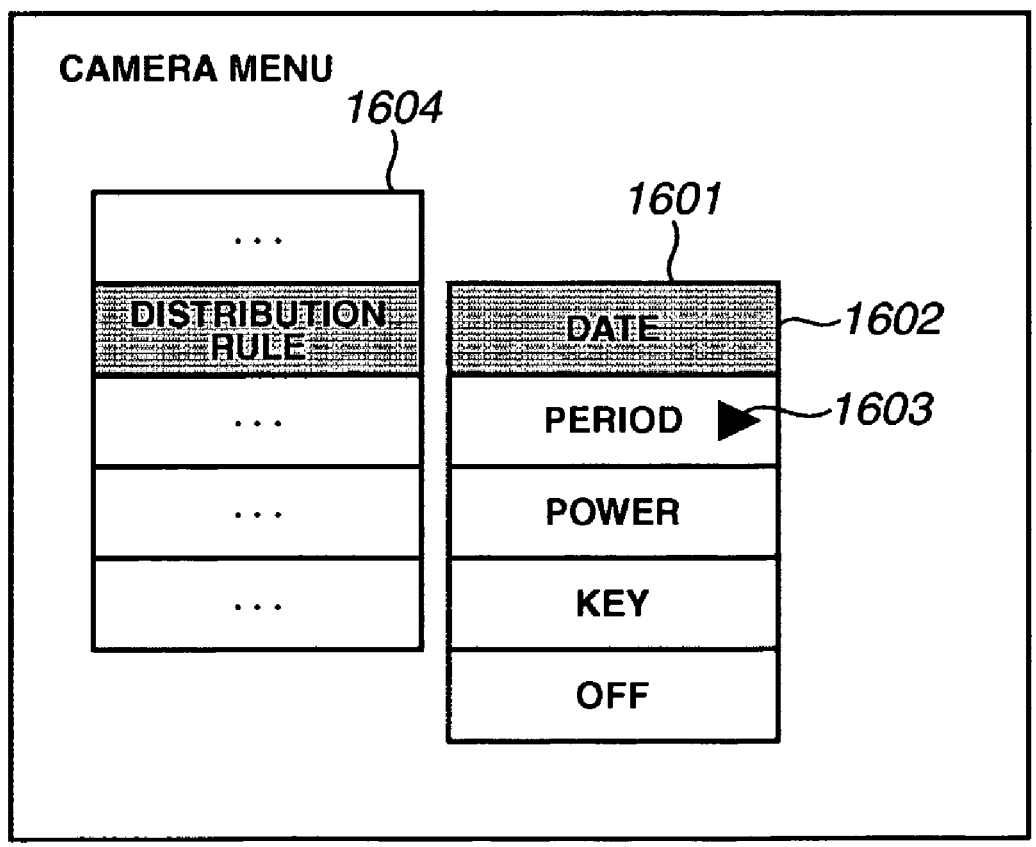
FIG. 16 shows a setting menu display example of a camera function.

FIG. 16 shows an example of a setting menu screen of a camera function. A reference numeral 1604 denotes a function item, and an item of "distribution rule" is selected at present. A reference numeral 1601 denotes a choice displayed for each item of the function items 1604. Any one of the choices 1602 is exclusively selected.

Figure 17:
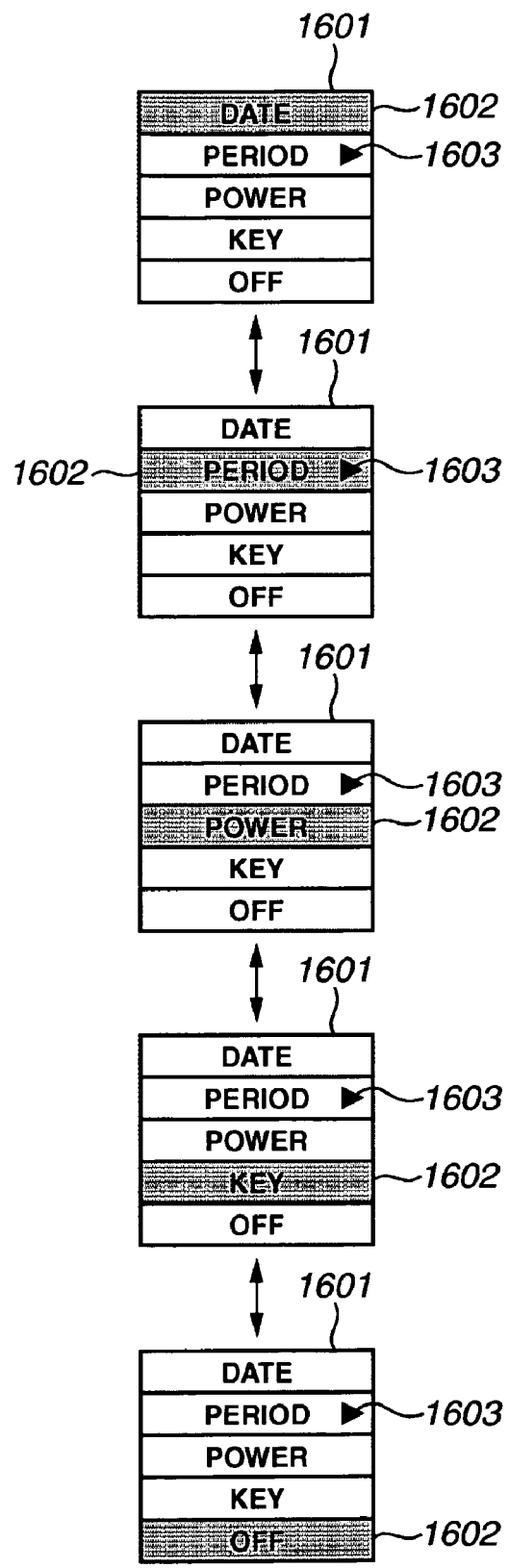
FIG. 17 shows a setting menu display example of a camera function.

FIG. 17 shows a situation of a change in the choice 1601. A reference numeral 1602 denotes a selected item, and moved up and down by user's operation as shown in FIG. 17. A reference numeral 1603 indicates presence of more detailed items during the choice "PERIOD". In FIGS. 16 and 17, as original group registration rules, five examples of "DATE", "PERIOD", "POWER", "KEY", and "OFF" are shown. Each will be briefly described.

When the "DATE" is selected, an original folder is generated to realize grouping for each date (day, month, year), and contents are registered.

When the "PERIOD" is selected, an original folder is generated to set contents photographed within a predetermined period in the same group, and the contents are registered. In FIG. 17, further, detailed items are provided for enabling the user to set a period for registering contents as the same group. For example, by setting a period to 3 days before going on a trip of 2 days and 3 nights, it is possible to register contents to be photographed in the trip period in the same group.

When the "POWER" is selected, an original folder is generated to set another group by timing of power ON/OFF of the main body, and contents are registered.

In case the "KEY" is selected, when a predetermined key of the video camera 100 is pressed, a new original folder is generated, and contents photographed thereafter are registered in the newly created group.

When the "OFF" is selected, photographed contents are registered in the root group without generating any original folders.

The above rules are only examples, and other rules may be employed. The "KEY" may be removed from the menu, and the position of the photographing mode changing switch 220 may always be valid in the program AE mode.

As described above, according to the embodiment, when the automatic mode is set, the camera function is automatically set, and the photographed contents are automatically classified into groups in accordance with the predetermined conditions. Thus, where the user is a beginner or just wishes to execute photographing with a minimum operation, the user is relieved of the burden of setting group conditions and can avoid confusion at the time of reproduction. In the program AE mode in which the user sets a camera, grouping conditions can be freely set. Thus, the contents photographed by the user under optional conditions can be classified into groups.

Next, automatic mode processing at the time of reproduction will be described.

Figure 18:
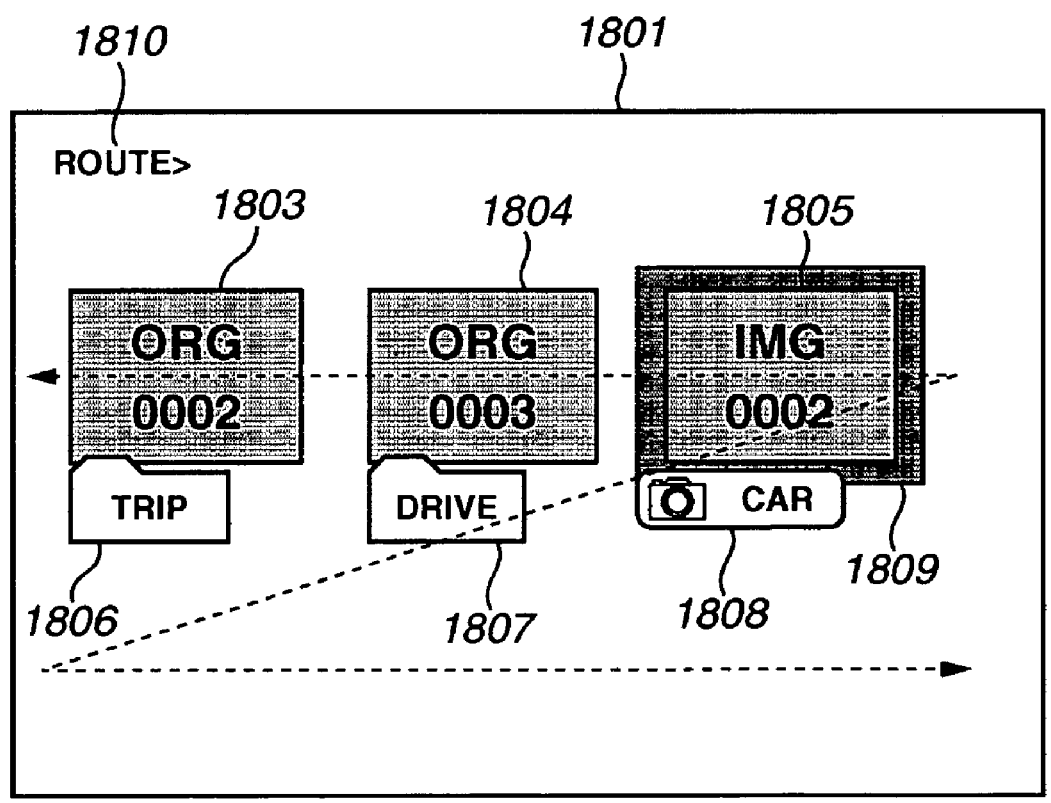
FIG. 18 shows a display example of a thumbnail screen in a reproducing mode.

FIG. 18 shows a thumbnail screen used for reading a contents list in the reproducing mode, or selecting contents to be reproduced. Here, description will be made by taking an example of reproducing contents which are grouped and recorded in the structures shown in FIG. 13.

A reference numeral 1801 denotes a contents list screen displayed on the LCD panel 151 at the time of reproduction, and a reference numeral 1810 denotes information indicating its hierarchy. Here, a list of current root groups is shown, and a broken line 1301 of FIG. 13 is a display target. Reference numerals 1803 to 1805 respectively show thumbnails of ORG 0002, ORG 0003 and IMG_0002. Reference numerals 1806 to 1808 respectively denote titles of the thumbnails 1803 to 1805. Titles for the original groups 1803 and 1804, and a title for the static image 1805 can be recognized by the difference of their designs.

A reference numeral 1809 denotes a selection frame displayed for a currently selected thumbnail. The user can move this selection frame 1809 by operating the switch provided in the main body. By operating the switch for transmitting the decision after selecting contents to be reproduced, the reproduction of the selected contents can be started.

For example, when the selection frame is a static image as shown in FIG. 18, the static image is reproduced from the disk D to be displayed on the entire screen. Reproduction is similarly started for a moving image.

Figure 19:
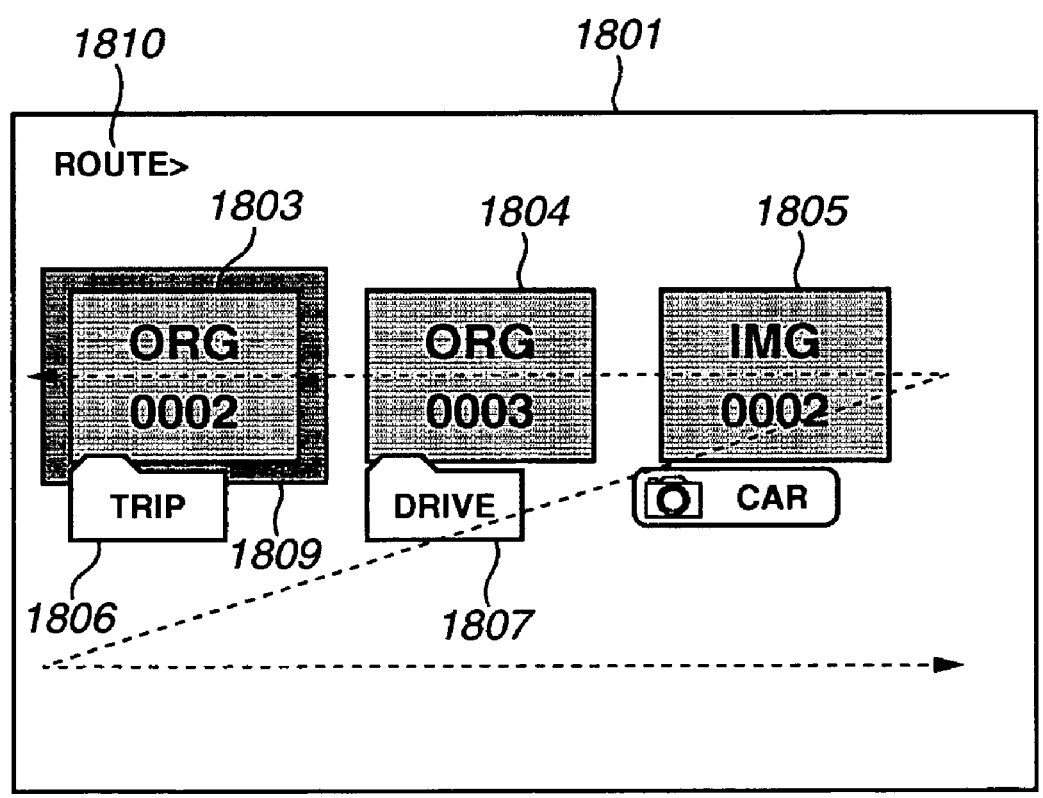
FIG. 19 shows a display example of a thumbnail screen in the reproducing mode.
Figure 20:
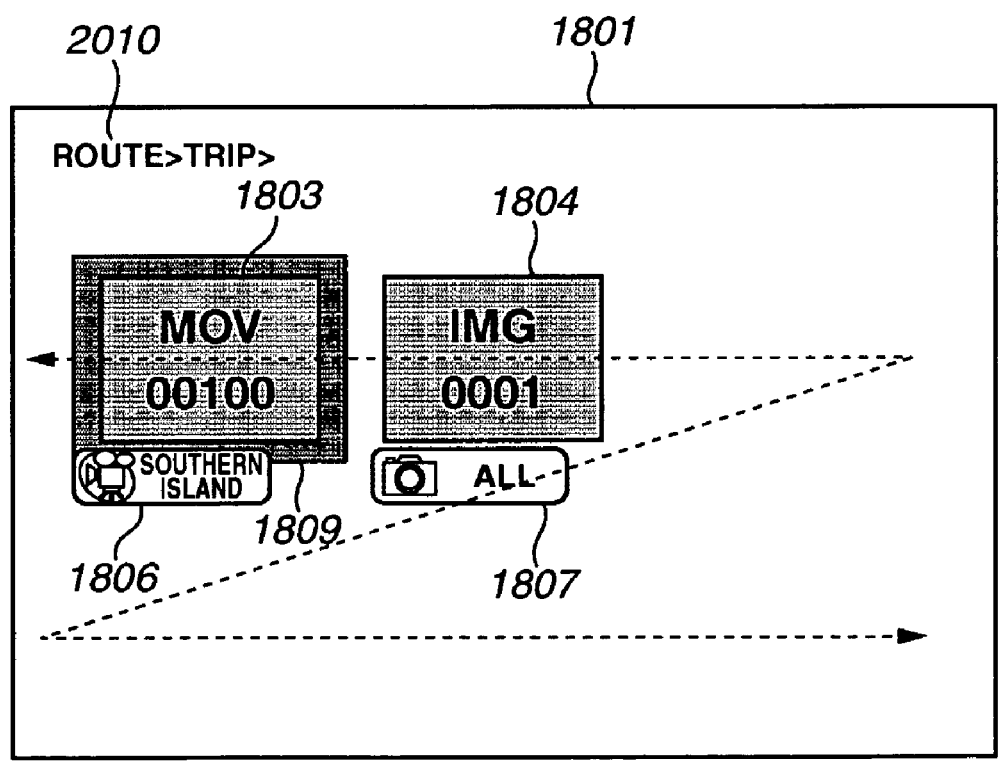
FIG. 20 shows a display example of a thumbnail screen in the reproducing mode.

On the other hand, when an original group is selected as shown in FIG. 19, the process proceeds to a next layer. FIG. 20 shows a state in which the process proceeds to displaying of a next layer. Thus, the apparatus includes the function of displaying the contents hierarchically grouped during photographing or during subsequent editing or the like.

To return to an upper layer, a general method may be employed such as allocating a switch for return, preparing a thumbnail for return, or designating a hierarchical display 2010 to display a thumbnail screen of a designated layer.

Figure 21:
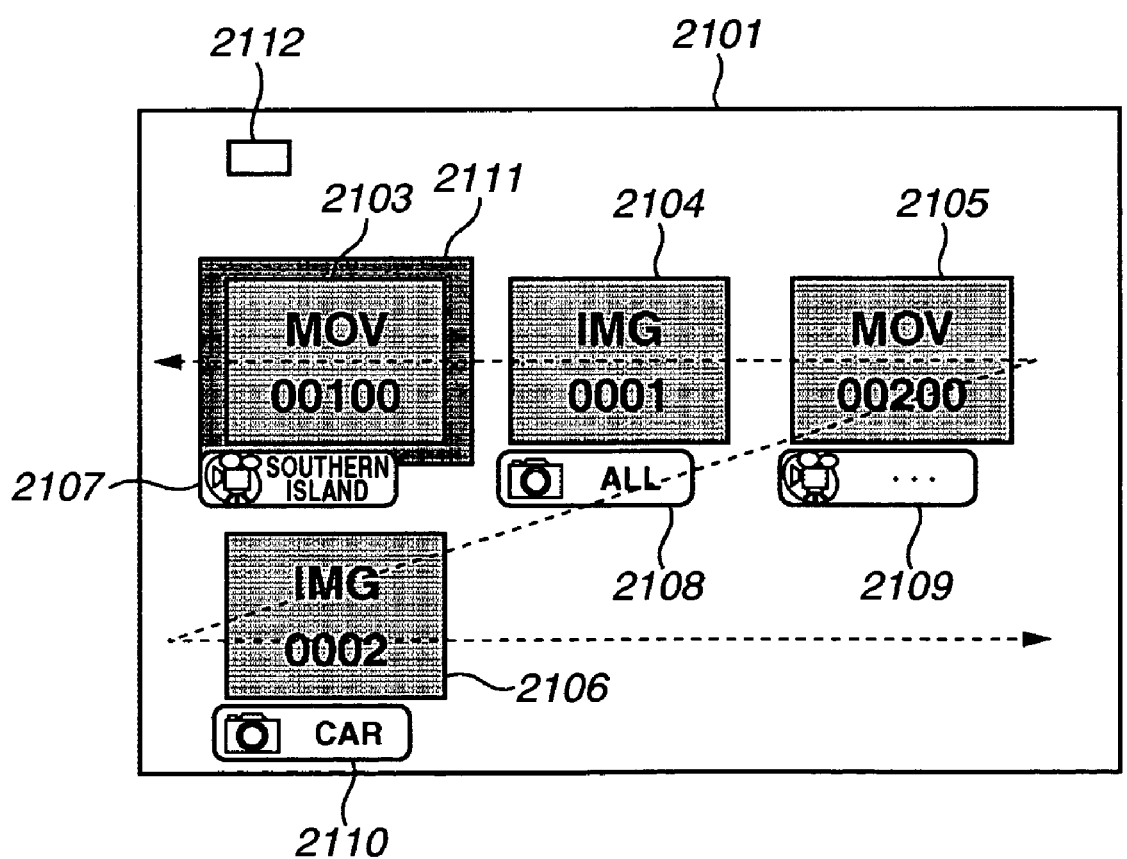
FIG. 21 shows a display example of a thumbnail screen in the reproducing mode.

On the other hand, FIG. 21 shows an example of displaying thumbnail images of contents by arranging them in photographed order, regardless of groups. A reference numeral 2101 denotes a contents list. In FIG. 21, if no layers are displayed, the hierarchy information 2112 is blank. Reference numerals 2103 to 2106 respectively show thumbnails of MOV 00100, IMG 0001, MOV 00200 and IMG 0002 respectively. Reference numerals 2107 to 2110 respectively denote titles of the thumbnails 2103 to 2106. A reference numeral 2111 denotes a selection frame.

Figure 22:
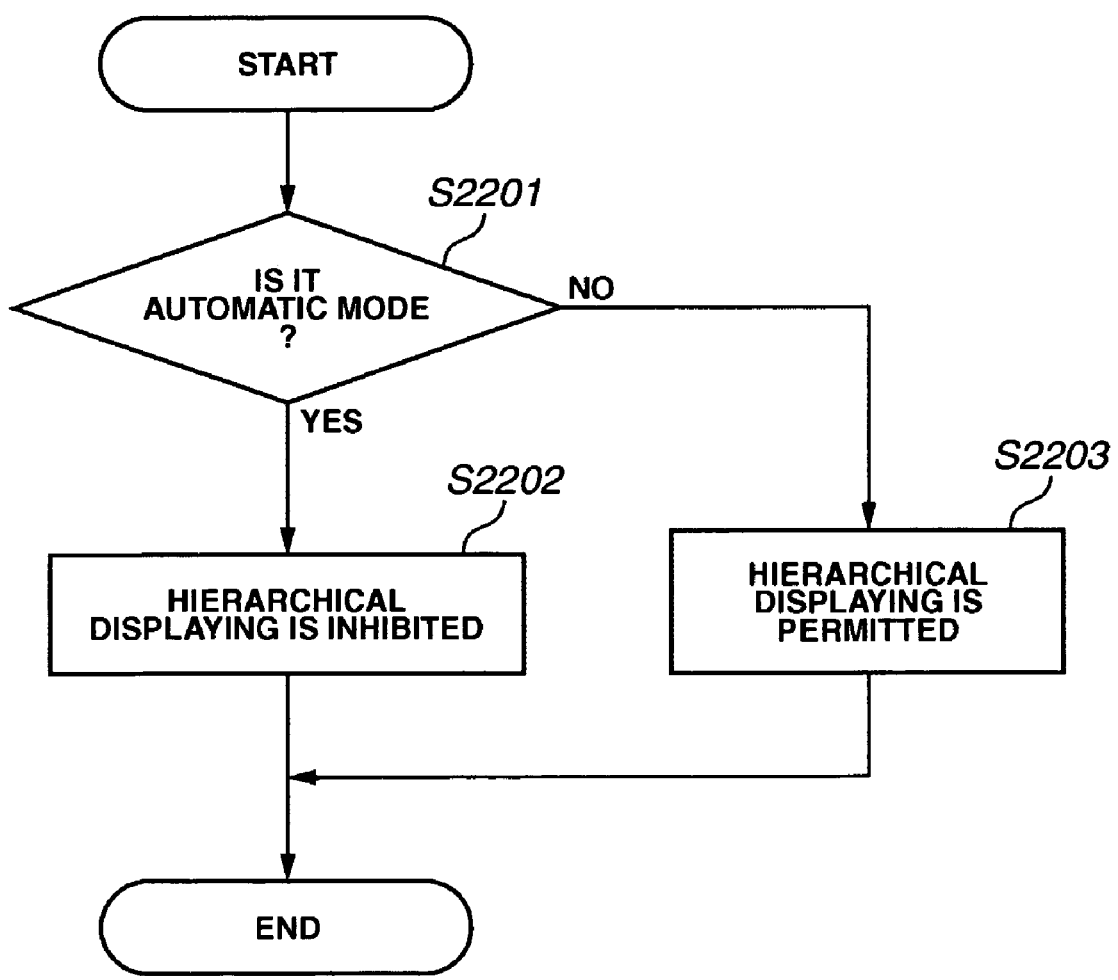
FIG. 22 is a flowchart showing a reproducing operation.

According to the embodiment, in connection with the aforementioned automatic mode, it is decided whether or not to execute the hierarchical displaying shown in FIG. 19 or FIG. 20. FIG. 22 is a flowchart for deciding whether to execute hierarchical displaying when the thumbnail screen is displayed.

First, it is determined whether the automatic mode has been set based on a position of the photographing mode changing switch 220 described above with reference to FIGS. 2A to 2C. As described above, by operating the photographing mode changing switch 220 during photographing, the mode can be switched between the automatic mode and the program AE mode during the photographing. According to the embodiment, however, a configuration is employed in which the automatic mode can be set by the changing switch 220 also during reproduction.

When the automatic mode is set in a step S2201, even if a hierarchical structure has been formed by the management file, hierarchical displaying similar to that shown in FIG. 19 or FIG. 20 is inhibited in a step S2202. Then the mode is easy and is used mainly by a beginner or the like, i.e., a time-sequential arrangement in the case of conventional video tape may be friendlier to the beginner.

If the automatic mode has not been set, hierarchical displaying similar to that shown in FIG. 19 or FIG. 20 is permitted in a step S2203.

Thus, when the position of the photographic mode changing switch is the automatic mode, no layers are displayed as shown in FIG. 21, providing a GUI which is easily used by a beginner.

On the other hand, when the position of the photographic mode changing switch 220 is not an automatic mode, hierarchy displaying similar to that shown in FIG. 19 or FIG. 20 is permitted, thereby a grouping function is provided which is nondependent on the file system.

As described above, by using the photographic mode changing switch 220 as a method for deciding an automatic mode and setting the limit to the display method on the thumbnail screen (contents list) in the reproducing mode, it is possible to provide a video camera which is easily used even by a beginner.

Next, the resume function during reproduction will be described.

As described above, in the case of the video tape, if it is stopped in the middle of reproduction, next reproduction is started from approximately the same position.

However, in the case where a disk medium is used, in order to protect the disk, the pickup is moved to a predetermined position (home position) each time reproduction is stopped. Thus, to start the reproduction again from the last position where reproduction was stopped, the position on the disk where the reproduction was stopped must be stored.

For that purpose, two cases are conceivable: first, reproduction is started from a position where reproduction was stopped throughout the entire disk, and second, reproduction is started from a position for each contents where reproduction was stopped.

FIG. 23 shows adding reproduction end position information for each content to the management information shown in FIG. 5. A RESUME element 2304 is reproduction end position information indicating that the MOV element 503 is reproduced and the reproduction is stopped at a frame position of 1 min. 5.22 sec. Based on this information a resume function can be provided which starts next reproduction from a sequel.

FIG. 24 shows an example of management information for executing time-sequential and continuous reproduction from one disk as a whole as in the case of a video tape.

FIG. 24 shows adding reproduction end information to the original group file as shown in FIG. 6. RESUME elements 2406 to 2408 are pieces of reproduction end position information. A difference from the example of FIG. 23 is that since FIG. 24 shows the original group, the contents therein that are relevant are described, and contents being reproduced are designated by the MOV element 2407.

In addition, in FIG. 24, reproduction is continuously carried out in predetermined order such as photographing order, and the reproduction is stopped at a frame position of 3 min. 5.22 sec., with respect to contents indicated by the MOV element 2407. This belongs to a root group which is a highest layer.

The video camera 100 of the embodiment includes both a resume function for all contents (contents resume, hereinafter) and a resume function for the entire disk (disk resume, hereinafter).

Figure 25:
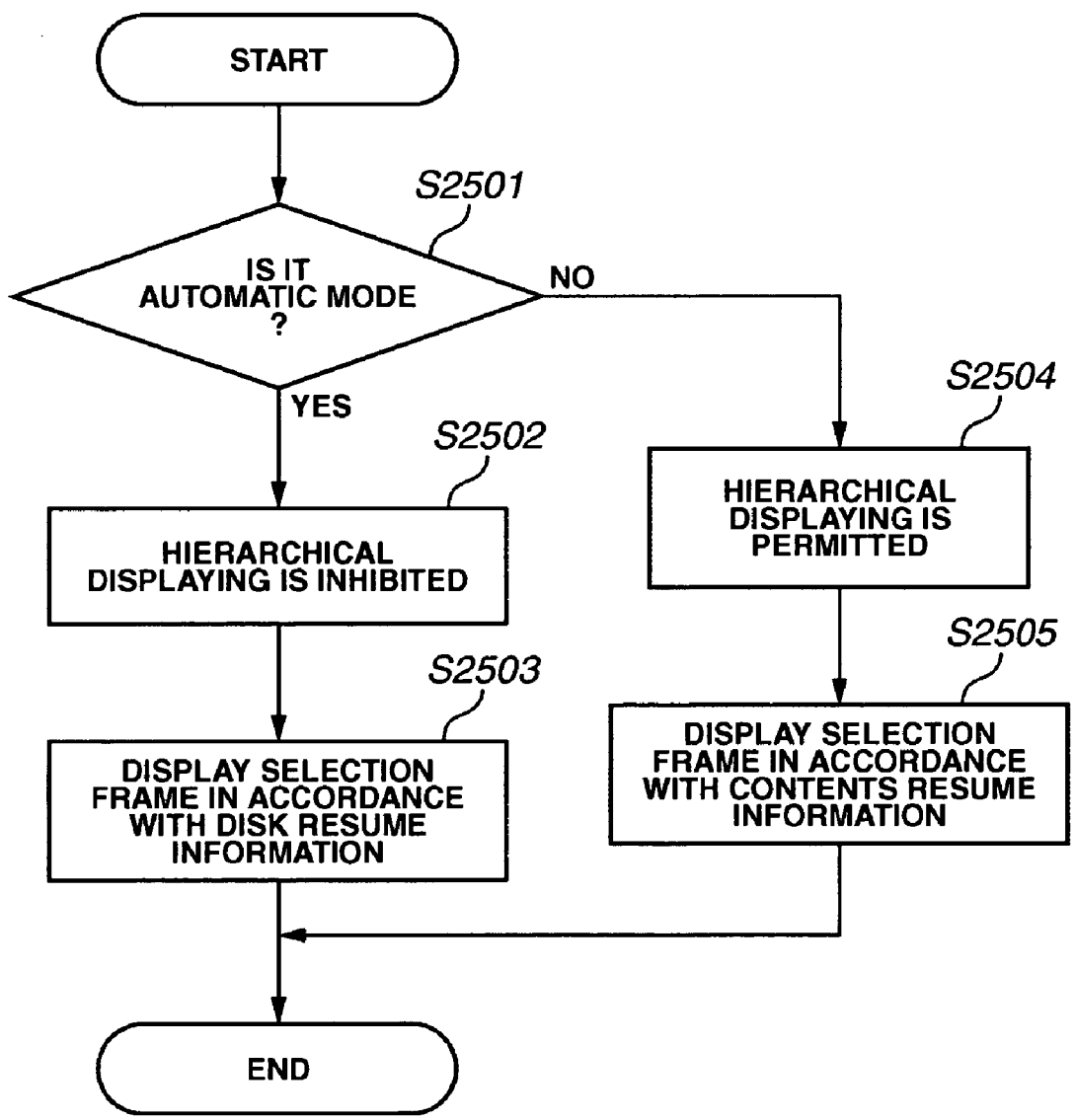
FIG. 25 shows a reproducing operation.

When the position of the photographic mode changing switch 220 is the automatic mode, disk resume is selected, and when the position is the program AE mode, contents resume is selected. FIG. 25 is a flowchart showing a reproducing operation including change of the hierarchical display.

First, in a step S2501, it is determined, based on a position of the photographic mode changing switch 220 in FIGS. 2A to 2C, whether the automatic mode has been set.

If the automatic mode has been set, then in a step S2502, hierarchical displaying is inhibited. Next, in a step S2503, based on disk resume information, a selection frame 1809 is displayed in a thumbnail of contents corresponding to a last position where reproduction was stopped.

When an instruction to start reproduction is given in this state, reproduction is started from the instructed position based on the disk resume information. When the user selects other contents on the thumbnail screen and starts reproduction, the reproduction is started from the head of the selected contents.

If, in step S2501, the automatic mode has not been set, then in a step S2504, hierarchical displaying is permitted. Next, in a step S2505, the selection frame 1809 is displayed for predetermined contents. The predetermined contents are not particularly defined here. A list of contents or original groups directly below the root group may be used. Subsequently, when the user selects contents and instructs to start a reproduction, the reproduction is started from a position designated by contents resume information in the management file corresponding to the selected contents.

The reproduction is started from a head when a time attribute of the resume information is 0 or there is no resume information.

In the contents resume, after the last of the contents is reproduced, the resume information is deleted, or the time attributes set to 0.

In the disk resume, after the last of the contents is reproduced, the resume information is deleted, or the time attributes set to 0.

In the step S2503, without displaying the thumbnail screen, an image at a reproduction start position of the contents placed in the disk resume position may be reproduced and displayed in a temporarily stopped state.

It has been described that the resume is based on each contents when the mode is not an automatic mode. However, it is also possible to adopt the way in which one of the two resume methods can be selected on the menu or the like.

As described above, according to the embodiment, it is possible to use the resume from the entire disk similar to the conventional video tape in case of the automatic mode and to use selectively the resume of each contents or the resume from the entire disk in the case of the non-automatic mode.

Thus, it is possible to provide both an easy mode for beginning user and a mode for an experienced user to suit.

Next, the playlist function will be described.

In the case of the video equipment that uses the disk medium of the embodiment, a number of products have been produced which include playlist functions of reproducing contents by optionally changing reproducing order of the contents based on characteristics thereof.

The video camera 100 of the embodiment includes such a playlist function. It is presumed in the embodiment that a playlist is described in a form compliant with SMIL. However, an src attribute value for designating a file name of a reproduced object takes on a file value. The file value (file-value) is represented by the following format:

file-value::=Manage-filename "# xpointer (//"Element-name"<@ID="Object-ID">)"

Here, the Manage-filename is a management name of a directory which stores a target file. The Element-name is an element name of a target entry. For example, it is "MOV" in the case of moving image data. The Object-ID is an id attribute value added to an entry of target data. Accordingly, by referring to each file from the playlist through the id attribute value, for example, even when the file name is changed, it is only necessary to change the src attribute value in the entry of the management file.

For example, it is presumed that there is static image data having an identifier of "IMG_0001" in /DCIM/101CANON/101CANON.4C. In the case of referring to this file, reference is made by describing "/DCIM/101CANON/101CANON.4C# xpointer (//[@id="IMG_0001"])". FIG. 26 shows a descriptive example of the playlist.

Next, process of referring to a moving image object like a tag 2601 from the playlist descriptive example in FIG. 26 will be described. In the tag 2601, an area of a designated file to be reproduced is omitted. This means that all the contents from head to end are designated. FIG. 27 shows a descriptive example when a range is designated. Reference numerals 2701 and 2702 denote tags describing references to moving image files as in the case of the tag 2601. However, one that omits a reference range (area) and one that designates starting and finishing positions are arranged. The tag 2701 omits a reference range, and the entire range is a reference target.

In the tag 2702, a ClipBegin attribute and a ClipEnd attribute are described, reference start and end positions are designated based on relative times (offset) from a contents head, and a Clip-value-MediaClipping value is represented by the following sentence structure:

Clip-value-MediaClipping::=<Metric "=">(Clock-val|Smpte-val)

Metric::=Smpte-type|"npt"

Smpte-type::="smpte"|"smpte-30-drop"|"smpte-25"

Smpte-val::=Hours ":" Minutes ":" Seconds<":" Frames<"." Subframes>>

Hours::=Digit+

Minutes::=Digit Digit; range from 00 to 59

Seconds::=Digit Digit; range from 00 to 59

Frames::=Digit Digit; smpte range=00-29, smpte-30-drop range=00-29, smpte-25 range=00-24

Subframes::=Digit Digit; smpte range=00-01, smpte-30-drop range=00-01, smpte-125 range=00-01

It is to be noted that the Clock-val is the aforementioned Clock value, and a Clock-val value is set when the Metric is omitted.

These attributes are defined as components of the Media-Clipping module. A descriptive example is that clipBegin="smpte=00:11:25:121", and clipBeing="npt=55s". Accordingly, in the tag 2702, reproduction is designated from a position of 50 sec., to a position of 10 min. 5 sec., from the head of the contents of id=MOV 00100. This is a format standardized by the SMIL, and an equipment or application software compliant with the Media-Clipping module of the SMIL can be pursed.

Thus, there is a type of process which designates reference start and reference end positions (hereinafter scene designation) and a type which omits such positions (herein after contents designation). When a playlist is created, the scene designation requires complex work by the user. On the other hand, in the case of the contents designation, thumbnails are selected in reproducing order only, and this work is easier as compared with the scene designation.

Thus, according to the embodiment, regarding such playlist process, only a playlist function based on the contents designation is enabled when the position of the photographic mode changing switch 220 is the automatic mode. When its position is the program AE mode, the user can select either the contents designation or the scene designation.

As a result, a video camera is provided which enables the beginner to automatically select the easy contents designation, and the experienced user to select the scene designation method at the time of creating the playlist.

Next, a second embodiment of the present invention will be described.

According to the foregoing embodiment, it is determined whether to set the automatic mode based on the position of the photographic mode changing switch 220 provided in the video camera main body 201.

However, if the disk D on which contents have been recorded is loaded to execute new photographing, there is a possibility that a photographic mode of the recorded contents and a photographic mode for executing the new photographing may be different from each other.

Further, even in the case of a disk on which contents have been recorded on the automatic mode, the aforementioned operation of the automatic mode may not be realized during reproduction because the main body is not in the automatic mode.

Thus, according to the second embodiment, photographic mode determination information is recorded on a disk, and a warning or the like is displayed by using this information.

According to the second embodiment, the photographic mode determination information is written in a predetermined area on the disk. The information may be arranged in a predetermined management file, or in an area which inhibits user's operation. According to the second embodiment, 2-bit data is recorded as the photographic mode determination information, and a lower 1 bit is set as an automatic mode photographic determination bit. The bit is initialized to 0 when a disk is inserted into a video camera in an unused state for the first time. Subsequently, the bit is rewritten to 1 when photographing is executed in the automatic mode for the first time. An upper 1 bit is set as a program AE mode photographic determination bit, and then rewritten similarly to the above.

Figure 28:
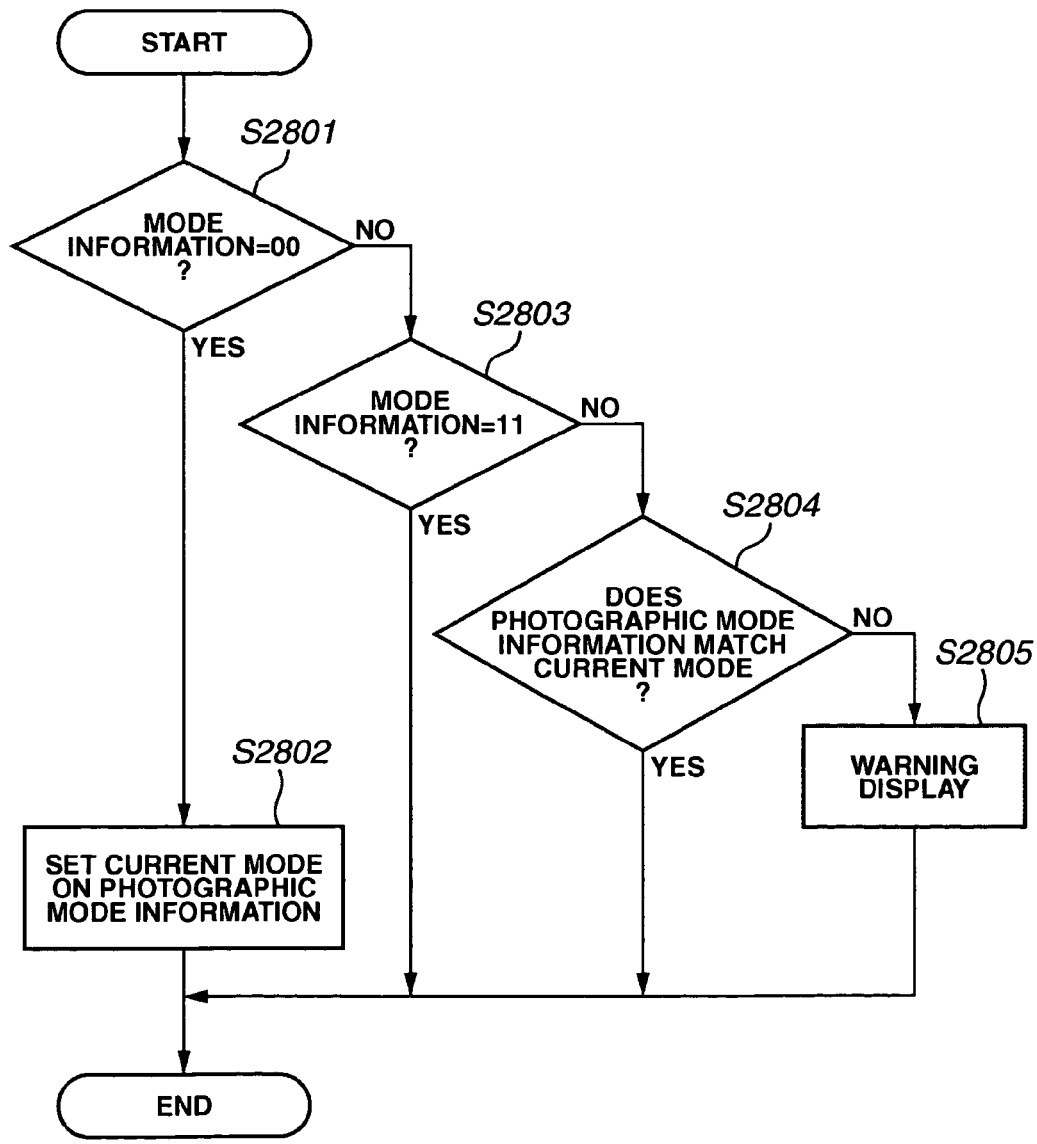
FIG. 28 is a flowchart showing a reproducing operation.

FIG. 28 is a flowchart showing a warning process based on the photographic mode determination information.

When a new disk is loaded, photographic mode information recorded on the disk is reproduced, and it is determined whether the 2-bit photographic mode information is 00 in a step S2801. If the information is not 00, it is recognized that contents have been already recorded on the disk in either one of the modes.

If the photographic mode information is 00, a photographic mode set during recording is set as the photographic mode information in a step S2802. The step S2802 is carried out when no contents have been recorded on the disk. Accordingly, the step is to record photographic mode information set when first contents are recorded on the disk.

If the photographic mode information is not 00 in the step S2801, it is further determined in a step S2803 whether the photographic mode information is 11. If the photographic mode information is 11, there is a mixture of contents photographed in the two photographic modes, and no warning display is necessary.

If the photographic mode information is not 11, it is determined in a step S2804 whether a mode indicated by the photographic mode information and a currently set photographic mode coincide.

For example, if the photographic mode information is 01, contents recorded in the automatic mode have been recorded on the disk. Thus, it is determined whether a currently set photographic mode is an automatic mode. If the current photographic mode coincides with the mode indicated by the photographic mode information, no special warning is necessary since photographing is executed in the mode identical to the previous photographic mode.

Figure 29:
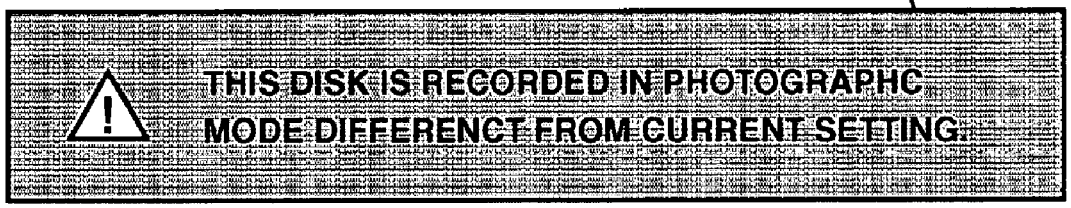
FIG. 29 shows a display example of a warning dialogue.
Figure 30:
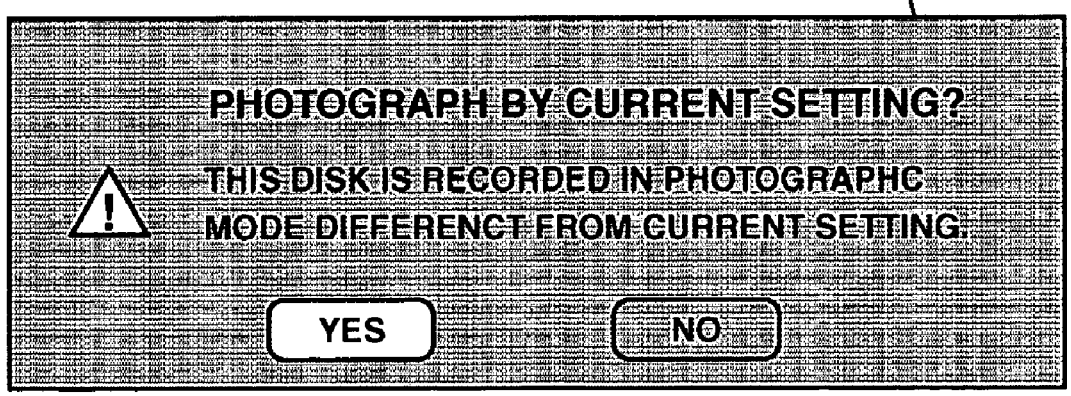
FIG. 30 shows a display example of a warning dialogue.

On the other hand, if the currently set photographic mode is different from the previous photographic mode, a warning to the user as shown in FIG. 29 is displayed on a LCD panel 151 in a step S2805. A period of this display may be a predetermined time, or until one of the keys is pressed. A dialogue similar to that shown in FIG. 30 may be displayed to make the user selects "YES" or "NO". For example, when "YES" is selected, display may prompt the user to delete the dialogue thereby setting a photographing standby state and to prompt the user to operate a photographic mode changing switch 220 when "NO" is selected.

As described above, according to the second embodiment, it is possible to issue a warning to the user to prevent mixing contents photographed in the automatic mode and contents photographed in the other mode in one disk.

For the reproduction of the static image, the reproducing time can be designated by setting the equipment when necessary. The reproducing mode in which the moving and static images are mixed has been described. However, for example, a distinction may be made by the mode dial between a moving image reproducing mode and a static image reproducing mode. The same holds true for the playlist.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-151981 filed May 21, 2004, which is hereby incorporated by reference herein.

What is claimed is:

1. An imaging apparatus comprising:
    an imaging unit that images and converts objects into image signals;
    a photographing function setting unit that optionally sets operation conditions of the imaging unit for setting exposure;
    a recording unit that records the image signals obtained by the imaging unit in a recording medium, the recording unit automatically classifying the image signals obtained by the imaging unit into groups in accordance with a classifying condition;
    a group condition setting unit that optionally selects one kind of classifying condition from among a plurality of kinds of classifying conditions for classifying the image signals recorded by the recording unit into the plurality of groups; and
    a mode switching unit that switches a photographic mode of the apparatus between a first photographic mode and a second photographic mode; and
    a control unit that controls the imaging unit in accordance with the photographic mode switched by the mode switching unit, the control unit causing the imaging unit to set the exposure in accordance with predetermined operation conditions in the first photographing mode, and causing the imaging unit to set the exposure in accordance with the operation conditions which are set by the photographing function setting unit and are different from the predetermined operation conditions in the second photographic mode,
    wherein the control unit changes the classifying condition for classifying the image signals by the recording unit in accordance with the photographic mode switched by the mode switching unit,
    the control unit causes the recording unit to automatically classify the image signals recorded in the recording medium in accordance with a predetermined kind of condition in the first photographic mode, and causes the recording unit to automatically classify the image signals recorded in the recording medium in accordance with the selected kind of classifying condition different from the predetermined kind of condition in the second photographic mode.

2. An imaging apparatus according to claim 1, wherein in the first photographic mode, the control unit causes the recording unit to classify the image signals in one group.

3. An imaging apparatus according to claim 1, wherein in the first photographic mode, the control unit selects photographing dates of the image signals as the predetermined kind of classifying condition and causes the recording unit to classify the image signals in accordance with photographing dates of the image signals.

4. An imaging apparatus according to claim 1, wherein the recording unit employs a hierarchical structure in which another optional group is created below an optional group.

5. An imaging apparatus according to claim 1, wherein the recording unit generates management information for identifying the image signals classified into the plurality of groups, and records the management information on the recording medium.

6. An imaging apparatus according to claim 1, further comprising:
    a changing switch that changes between the first photographic mode and the second photographic mode; and
    a reproducing unit that reproduces the image signals from the recording medium,
    wherein the mode switching unit further changes between first and second reproducing modes operated under different operation conditions for a predetermined reproducing function of the reproducing unit, sets to the first reproducing mode if the changing switch is in a first state corresponding to the first photographic mode, and sets to the second reproducing mode if the changing switch is in a second state corresponding to the second photographic mode.

7. An imaging apparatus according to claim 6, further comprising:

a display unit that displays record states of the image signals recorded on the recording medium,
wherein the display unit displays thumbnail images of the image signals in the first reproducing mode, and displays thumbnail images of the groups in the second reproducing mode.

8. An imaging apparatus according to claim 6, wherein the display unit displays file names of image files each including the image signal in photographing order in the first reproducing mode, and displays a group name of the groups in the second reproducing mode.

9. An imaging apparatus according to claim 6, wherein the reproducing unit further includes a recording medium resume function of storing a last reproduction stopping position in the one recording medium and subsequently starting the reproduction from the reproduction stopping position, and a contents resume function of storing last reproduction stopping position for every plurality of image files containing the image signals and subsequently starting the reproduction from the reproduction stopping position for each image file, wherein the reproducing unit makes the recording medium resume function effective in the first reproducing mode, and either one of the contents resume function or the recording medium resume function effective in the second reproducing mode.

10. An imaging apparatus according to claim 6, further comprising:
a designation unit that designates reproducing order of the image signals recorded on the recording medium; and
a playlist processing unit that generates playlist information indicating the reproducing order designated by the designation unit,
wherein in the first reproducing mode, designation of the reproducing order is carried out by the designation unit for each of image file storing the image signals, and in the second reproducing mode, a reproduction starting position or a reproduction stopping position is set in each of the image files by the designation unit.

11. An imaging apparatus according to claim 1, wherein the recording unit further records mode information indicating either one of the first photographic mode or the second photographic mode set during the recording of the image signals, and issues a predetermined warning if a mode of the image signals recorded on the recording medium is different from a mode currently set by the mode switching unit.

12. An imaging apparatus according to claim 1, wherein the recording medium is a random-access recording medium.

13. An imaging apparatus comprising:
an imaging unit that images and converts objects into image signals;
a photographing function setting unit that optionally sets operation conditions of the imaging unit for setting exposure;
a recording unit that records the image signals obtained by the imaging unit in a recording medium, the recording unit automatically classifying the image signals obtained by the imaging unit into groups in accordance with a classifying condition;
a group condition setting unit that optionally selects one kind of classifying condition from among a plurality of kinds of classifying conditions for classifying the image signals recorded by the recording unit into the plurality of groups; and
a photographic mode switching unit that switches a photographic mode of the apparatus between a first photographic mode in which the imaging unit sets the exposure in accordance with predetermined operation conditions and a second photographic mode in which the imaging unit sets the exposure in accordance with the operation conditions which are set by the photographing function setting unit and are different from the predetermined operation conditions,
wherein the recording unit changes the classifying condition for classifying the image signals recorded in the recording medium in accordance with the photographic mode switched by the photographic mode switching unit,
wherein the recording unit automatically classifies the image signals recorded in the recording medium in accordance with a predetermined kind of condition in the first photographic mode, and automatically classifies the image signals recorded in the recording medium in accordance with the selected kind of classifying condition selected by the group condition setting unit different from the predetermined kind of condition.

* * * * *